(12) United States Patent
Kasamatsu et al.

(10) Patent No.: US 7,538,825 B2
(45) Date of Patent: May 26, 2009

(54) WIRELESS REDISTRIBUTION SYSTEM FOR TERRESTRIAL DIGITAL TELEVISION BROADCASTING

(75) Inventors: Hideki Kasamatsu, Katano (JP); Motoaki Asao, Higashiosaka (JP); Akihiko Yamashita, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 584 days.

(21) Appl. No.: 11/214,029

(22) Filed: Aug. 30, 2005

(65) Prior Publication Data

US 2006/0190972 A1 Aug. 24, 2006

(30) Foreign Application Priority Data

| Aug. 31, 2004 | (JP) | 2004-253461 |
| Aug. 31, 2004 | (JP) | 2004-253463 |
| Aug. 31, 2004 | (JP) | 2004-253464 |
| Sep. 8, 2004 | (JP) | 2004-261470 |

(51) Int. Cl.
*H04N 5/50* (2006.01)
*H04N 7/18* (2006.01)
*H04H 20/71* (2008.01)

(52) U.S. Cl. ............ 348/725; 348/722; 348/607; 348/731; 725/80; 725/81; 455/3.01

(58) Field of Classification Search ........ 348/722, 348/725, 607–608, 553, 555, 731; 725/74, 725/80, 81; 455/3.01, 93
See application file for complete search history.

(56) References Cited

U.S. PATENT DOCUMENTS 5,469,431 A * 11/1995 Wendorf et al. ............ 370/254
6,134,419 A * 10/2000 Williams ..................... 725/151
6,166,774 A * 12/2000 Plonka ........................ 348/487
6,567,984 B1 * 5/2003 Allport ........................ 725/110
6,704,060 B2 * 3/2004 Levandowski .............. 348/725
6,714,261 B1 * 3/2004 Matsuura .................... 348/731
6,915,529 B1 * 7/2005 Suematsu et al. ............. 725/78
6,996,837 B1 * 2/2006 Miura et al. .................. 725/78
7,102,699 B2 * 9/2006 Rodolico ..................... 348/723
7,133,082 B2 * 11/2006 Limberg ..................... 348/725
7,151,575 B1 * 12/2006 Landry et al. ............... 348/723

(Continued)

FOREIGN PATENT DOCUMENTS

JP 03-259666 A 11/1991

(Continued)

OTHER PUBLICATIONS

Japanese Office Action dated Feb. 26, 2008, issued in corresponding Japanese Patent Application No. 2004-261470.

*Primary Examiner*—Brian P Yenke
(74) *Attorney, Agent, or Firm*—Westerman, Hattori, Daniels & Adrian, LLP.

(57) ABSTRACT

A transmitter includes: frequency conversion means for collectively frequency-converting terrestrial digital TV broadcast signals inputted such that the frequency of terrestrial digital TV broadcast signals of a viewing desired channel inputted by viewing desired channel input means, among the terrestrial digital TV broadcast signals inputted, are converted to a frequency of a specific unused channel of a predetermined VHF band; filter means for extracting only TV broadcast signals of the specific unused channel of the predetermined VHF band among the TV broadcast signals obtained by the frequency conversion means; and transmission means for amplifying and wirelessly transmitting the TV broadcast signals extracted by the filter means.

13 Claims, 15 Drawing Sheets

U.S. PATENT DOCUMENTS

| | | | |
|---|---|---|---|
| 7,194,753 B1 * | 3/2007 | Fries et al. | 725/38 |
| 2002/0039393 A1 | 4/2002 | Shibata et al. | |
| 2002/0056140 A1 * | 5/2002 | Oishi et al. | 725/148 |
| 2002/0122137 A1 * | 9/2002 | Chen et al. | 348/552 |
| 2004/0098739 A1 * | 5/2004 | Rakib | 725/15 |
| 2005/0022249 A1 | 1/2005 | Shibusawa | |
| 2006/0053453 A1 * | 3/2006 | Kasamatsu et al. | 725/81 |
| 2006/0067354 A1 * | 3/2006 | Waltho et al. | 370/433 |
| 2006/0161957 A1 * | 7/2006 | Lee et al. | 725/62 |
| 2007/0072606 A1 * | 3/2007 | van Rooyen | 455/434 |
| 2007/0110181 A1 * | 5/2007 | Eskildsen | 375/295 |
| 2007/0118859 A1 * | 5/2007 | Tsukahara et al. | 725/68 |
| 2008/0106651 A1 * | 5/2008 | Goyal et al. | 348/726 |

FOREIGN PATENT DOCUMENTS

| | | |
|---|---|---|
| JP | 06-141376 A | 5/1994 |
| JP | 09-162758 A | 6/1997 |
| JP | 09-263022 A | 10/1997 |
| JP | 10-117390 A | 5/1998 |
| JP | 2002-057948 A | 2/2002 |
| JP | 2002-111615 A | 4/2002 |
| JP | 2003-018563 A | 1/2003 |
| JP | 2003-143494 A | 5/2003 |
| JP | 2004-128719 | 4/2004 |
| JP | 2004-128720 | 4/2004 |
| JP | 2005-12583 A | 1/2005 |
| JP | 4017619 B2 | 9/2007 |
| JP | 4017620 B2 | 9/2007 |

* cited by examiner

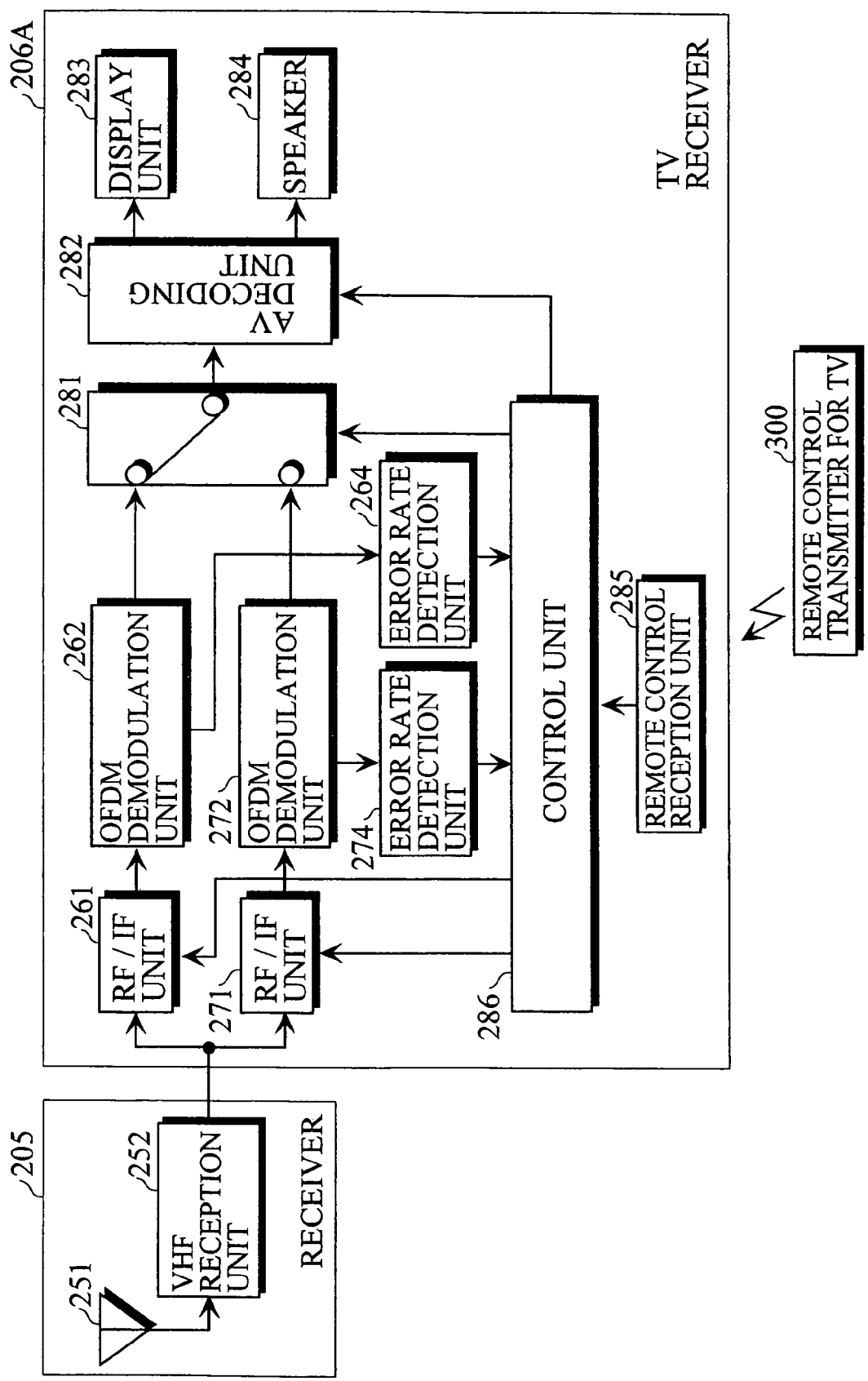

WIRELESS REDISTRIBUTION SYSTEM FOR TERRESTRIAL DIGITAL TELEVISION BROADCASTING

BACKGROUND OF THE INVENTION

1. Field of the Invention

The present invention relates to a wireless redistribution system for terrestrial digital TV broadcasting.

2. Description of the Related Art

In Japan, the terrestrial digital TV broadcasting started on Dec. 1, 2003 in three metropolitan areas of Kanto, Chukyo and Kinki. The terrestrial digital TV broadcasting adopts an OFDM (Orthogonal Frequency Division Multiplexing) system not being subject to multipath interference, enabling stable high quality reception with little double-reflection of images (ghost defect) which have been caused in the analog TV broadcasting or the like. The terrestrial digital TV broadcasting is performed on the UHF band (470 to 770 MHz).

As modes of receiving the terrestrial digital TV broadcasting with a terrestrial digital TV receiver, generally, there are following types.

(1) Terrestrial digital TV broadcast signals are received by an outdoor antenna. The terrestrial digital TV broadcast signals received by the outdoor antenna are distributed to each room with antenna cables, and guided to a TV terminal provided on a wall of each room. To the TV terminal provided on a wall of each room, an antenna terminal of a terrestrial digital TV receiver is connected via an antenna cable.

In such a reception mode, an antenna terminal of a terrestrial digital TV receiver must be connected to a TV terminal provided on a wall via an antenna cable. This deteriorates the outer appearance and also causes a problem of the wiring being troublesome. Further, layouts of the TV receiver are limited; therefore, the degree of freedom in arrangement positions of the TV receiver is impaired.

(2) An UHF antenna (e.g., UDMF62: manufactured by Nippon Antenna) is provided at an edge of the eaves or veranda without providing an antenna on the rooftop (on the roof), and an antenna cable is drawn into a room therefrom so as to connect directly to an antenna terminal of a terrestrial digital TV receiver.

Even in such a reception mode, an antenna cable must be drawn into a room so as to be connected to a terrestrial digital TV receiver. This also deteriorates the outer appearance and causes a problem of the wiring being troublesome. Further, layouts of the TV receiver are limited; therefore, the degree of freedom in arrangement positions of the TV receiver is impaired.

(3) The terrestrial digital TV broadcast signals are received by an indoor antenna connected to a terrestrial digital TV receiver.

In such a reception mode, limitation in the layouts of the TV receiver caused by wiring of an antenna cable is solved. However, there is a problem that a radio wave shield loss in the room is caused. Particularly, in the UHF band used for terrestrial digital TV broadcast signals, attenuation loss when passing through a building is large comparing with the VHF band used in the terrestrial analog TV broadcasting; therefore, there is a problem that arrangement positions of a TV receiver are limited from the viewpoint of the receiving sensitivity.

Thus, there has been developed an indoor redistribution system in which terrestrial digital TV broadcast signals inputted into a room are amplified by a wireless transmitter, and are retransmitted to a TV receiver wirelessly (see JP-A 2004-128719 and JP-A 2004-128720). In this indoor retransmission system, terrestrial digital TV broadcast signals of the UHF band, inputted into a room, are amplified directly and retransmitted, without being frequency-converted.

In the frequency of the UHF band, a transmission output level of a wireless transmitter is limited to a very low level as described later. This causes a problem that only a short range transmission is possible.

Further, when both of the direct broadcast radio wave transmitted from a broadcasting station and the retransmitted radio wave transmitted from a wireless transmitter are received and inputted in an indoor reception antenna, signals of the same frequency channel are inputted in a TV receiver. Thereby, there may be a case where interference disturbance of the same channel is caused and reception becomes impossible.

In order to prevent such a case, antennas or circuits must be added with devises for preventing deterioration caused by the same channel disturbance of terrestrial digital TV broadcast signals.

SUMMARY OF THE INVENTION

An object of the present invention is to provide a wireless redistribution system for terrestrial digital TV broadcasting, in which interference disturbance of the same channel of terrestrial digital TV broadcast signals can be prevented by performing frequency conversion on a transmitter side, and frequency conversion is not required on a receiver side.

Another object of the present invention is to provide a wireless redistribution system for terrestrial digital TV broadcasting, in which interference disturbance of the same channel of terrestrial digital TV broadcast signals can be prevented, frequency conversion is not required on a receiver side, and a viewed channel of the terrestrial digital TV broadcasting is easily recognized.

Still another object of the present invention is to provide a wireless redistribution system for terrestrial digital TV broadcasting, in which interference disturbance of the same channel of terrestrial digital TV broadcast signals can be prevented, frequency conversion is not required on a receiver side, and the receiving quality and the receiving probability are improved.

According to a first aspect of the present invention, a wireless redistribution system for terrestrial digital TV broadcasting is applied to a TV receiver capable of receiving TV broadcast signals of a VHF band in addition to TV broadcast signals of a UHF band as a frequency band of terrestrial digital TV broadcast signals. The wireless redistribution system comprises: a transmitter, into which terrestrial digital TV broadcast signals received by an outdoor antenna are inputted, for frequency-converting the terrestrial digital TV broadcast signals inputted and then transmitting them wirelessly; viewing desired channel input means for inputting a viewing desired channel of the terrestrial digital TV broadcasting into the transmitter; and a receiver for receiving and amplifying signals transmitted from the transmitter, and then supplying them to the TV receiver. Herein, the transmitter includes: frequency conversion means for collectively frequency-converting terrestrial digital TV broadcast signals inputted such that the frequency of terrestrial digital TV broadcast signals of a viewing desired channel inputted by the viewing desired channel input means, among the terrestrial digital TV broadcast signals inputted, are converted to a frequency of a specific unused channel of a predetermined VHF band; filter means for extracting only TV broadcast signals of the specific unused channel of the predetermined VHF band among the TV broadcast signals obtained by the frequency conversion means; and transmission means for amplifying and wirelessly transmitting the TV broadcast signals extracted by the filter means.

Preferably, the frequency of the specific unused channel of the predetermined VHF band is a frequency of a specific unused channel of a VHF band within a range between 260 MHz and 470 MHz.

An example of the viewing desired channel input means includes a remote control transmitter for transmitting the viewing desired channel to the transmitter wirelessly or with an infrared ray.

Examples of the viewing desired channel input means include: a remote control transmitter for transmitting the viewing desired channel to the receiver wirelessly or with an infrared ray; and means, provided in the receiver, for receiving the viewing desired channel transmitted from the remote control transmitter, and transmitting it to the transmitter.

Examples of the viewing desired channel input means include: a remote control transmitter for a TV for transmitting the viewing desired channel to the TV receiver wirelessly or with an infrared ray; means, provided in the TV receiver, for receiving the viewing desired channel transmitted from the remote control transmitter for the TV, and transmitting it to the receiver; and means, provided in the receiver, for transmitting the viewing desired channel transmitted from the TV receiver to the transmitter.

According to a second aspect of the present invention, a wireless redistribution system for terrestrial digital TV broadcasting comprises: a TV receiver capable of receiving TV broadcast signals of a VHF band in addition to TV broadcast signals of a UHF band as a frequency of terrestrial digital TV broadcast signals; a transmitter, into which terrestrial digital TV broadcast signals received by an outdoor antenna is inputted, for frequency-converting the terrestrial digital TV broadcast signals inputted and then transmitting them wirelessly; viewing desired channel input means for inputting a viewing desired channel of the terrestrial digital TV broadcasting into the transmitter and into the TV receiver; and a receiver for receiving and amplifying signals transmitted from the transmitter and then supplying them to the TV receiver. Herein, the transmitter includes: frequency conversion means for collectively frequency-converting the terrestrial digital TV broadcast signals inputted such that a frequency of the terrestrial digital TV broadcast signals of the viewing desired channel inputted by the viewing desired channel input means, among the terrestrial digital TV broadcast signals inputted, is converted to a frequency of a specific unused channel of a predetermined VHF band; filter means for extracting only TV broadcast signals of the specific unused channel of the predetermined VHF band among the TV broadcast signals obtained by the frequency conversion means; and transmission means for amplifying and wirelessly transmitting the TV broadcast signals extracted by the filter means. The TV receiver includes means for displaying the viewing desired channel of the terrestrial digital TV broadcasting inputted by the viewing desired channel input means.

Preferably, the frequency of the specific unused channel of the predetermined VHF band is a frequency of a specific unused channel of a VHF band within a range between 260 MHz and 470 MHz.

An example of the viewing desired channel input means includes a remote control transmitter for transmitting the viewing desired channel to the transmitter and to the TV receiver wirelessly or with an infrared ray.

Examples of the viewing desired channel input means include: a remote control transmitter for transmitting the viewing desired channel to the transmitter wirelessly or with an infrared ray; and means for inputting the viewing desired channel, transmitted from the remote control transmitter to the transmitter, into the TV receiver via the transmitter and the receiver.

According to a third aspect of the present invention, a wireless redistribution system for terrestrial digital TV broadcasting comprises: a TV receiver capable of receiving TV broadcast signals of a VHF band in addition to TV broadcast signals of a UHF band as a frequency of terrestrial digital TV broadcast signals; a transmitter, into which terrestrial digital TV broadcast signals received by an outdoor antenna is inputted, for frequency-converting the terrestrial digital TV broadcast signals inputted and then transmitting them wirelessly; viewing desired channel input means for inputting a viewing desired channel of the terrestrial digital TV broadcasting into the transmitter; and a receiver for receiving and amplifying signals transmitted from the transmitter, and then supplying them to the TV receiver. Herein, the transmitter includes: first means for frequency-converting terrestrial digital TV broadcast signals of the viewing desired channel inputted by the viewing desired channel input means, among the terrestrial digital TV broadcast signals inputted to a plurality of unused channels of a predetermined VHF band; and second means for amplifying and wirelessly transmitting the terrestrial digital TV broadcast signals of the viewing desired channel frequency-converted to the plurality of unused channels of the VHF band by the first means. The TV receiver includes: selection means for selecting TV broadcast signals of a channel having a high receiving quality, among the TV broadcast signals of the plurality of channels supplied from the transmitter via the receiver; and reproduction means for reproducing the TV broadcast signals selected by the selection means.

Preferably, the frequency of the specific unused channel of the predetermined VHF band is a frequency of a specific unused channel of a VHF band within a range between 260 MHz and 470 MHz.

An example of the selection means includes means for selecting TV broadcast signals of a channel having high receiving quality by comparing received signal levels of TV broadcast signals of the plurality of channels supplied from the transmitter via the receiver.

Another example of the selection means includes means for selecting TV broadcast signals of a channel having high receiving quality by comparing received signal error rates of TV broadcast signals of the plurality of channels supplied from the transmitter via the receiver.

BRIEF DESCRIPTION OF THE DRAWINGS

FIG. 16 is a block diagram showing another example of a TV receiver.

DETAILED DESCRIPTION OF PREFERRED EMBODIMENTS

A. Description of First Embodiment

Figure 1:
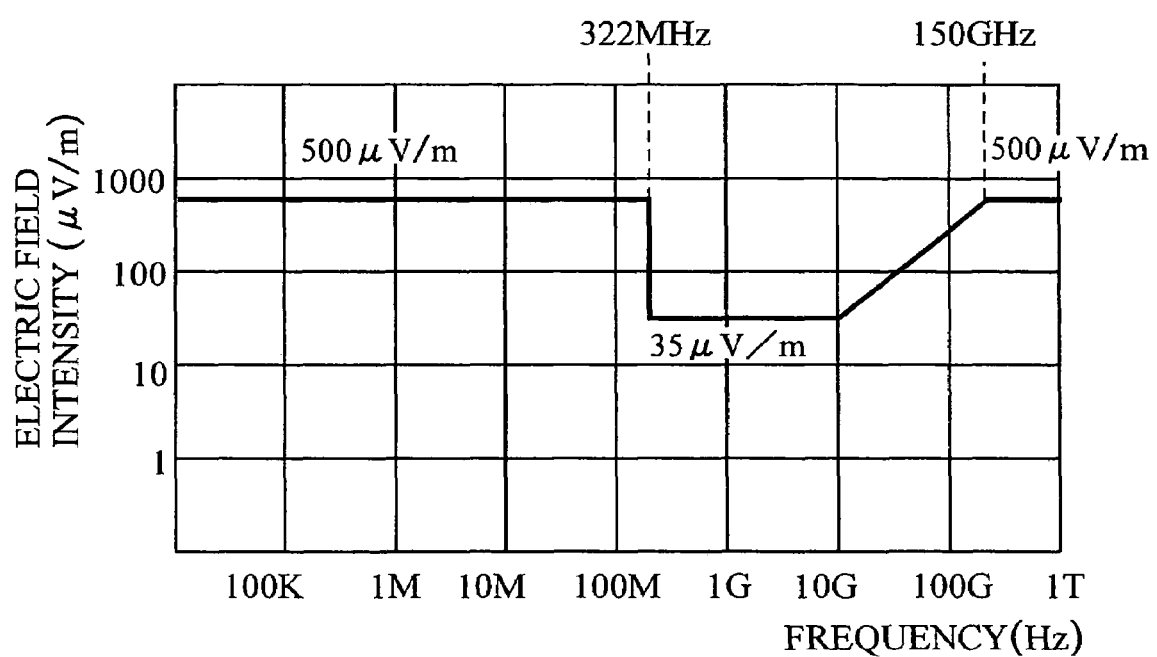
FIG. 1 is a graph showing the electric field intensity (allowance) with respect to frequency bands defined in the weak radio wave standard.

1. Description of Terrestrial Digital Broadcasting TV Receiver to which this Invention is Applied Table 1 shows each reception channel and center frequency of the terrestrial digital TV broadcasting in Japan.

TABLE 1

| Reception channel | Center frequency |
| --- | --- |
| UHF13 | 473 + 1/7 MHz |
| UHF14 | 479 + 1/7 MHz |
| UHF15 | 485 + 1/7 MHz |
| . | . |
| . | . |
| . | . |
| UHF61 | 761 + 1/7 MHz |
| UHF62 | 767 + 1/7 MHz |

The reception channels of the terrestrial digital TV broadcasting are UHF13ch to UHF62ch. The center frequencies are 473+1/7 MHz for 13ch, 479+1/7 MHz for 14ch, and 767+1/7 MHz for 62ch.

The frequency band to which the terrestrial digital TV broadcasting is introduced is a range between UHF13ch and UHF62ch; therefore, it is required to receive the frequency as a receiving frequency range of a terrestrial digital broadcasting TV receiver.

Currently, the broadcasting has been started from December, 2003 in three metropolitan areas (Kanto wide area, Chukyo wide area, Kinki wide area). The broadcasting in the Kinki area, for example, is performed as shown in Table 2.

TABLE 2

| Reception channel | Center frequency | Broadcasting station |
| --- | --- | --- |
| UHF13 | 473 + 1/7 MHz | NHK Education |
| UHF14 | 479 + 1/7 MHz | Yomiuri TV |
| UHF15 | 485 + 1/7 MHz | Asahi Broadcasting |
| UHF16 | 491 + 1/7 MHz | Mainichi Broadcasting |
| UHF17 | 497 + 1/7 MHz | Kansai TV |
| UHF18 | 503 + 1/7 MHz | TV Osaka |
| UHF24 | 539 + 1/7 MHz | NHK General |

On the other hand, as for the reception mode of the current terrestrial analog TV broadcasting, community reception accounts for almost half of all households, if community viewing in multiple dwelling houses is included. In the transmission band in the community viewing facilities, most are not wide-banded up to the UHF band, and the UHF TV broadcasting is transmitted by being down-converted to unused channels (channels unused in the area) of low frequency such as VHF_Low/High (VHF low/high band), VHF_MID (VHF mid band) and VHF_SHB (VHF super high band), or the like.

Therefore, community reception is anticipated even for stationary-type TV receivers for the terrestrial digital TV broadcasting, in particular. Therefore, ARIB standard ARIB STD-B21 defines that the range of reception channels of a terrestrial digital broadcasting receiver desirably supports VHF_Low/High band (VHF1ch to VHF12ch), VHF_MID band (C13ch to C22ch) and VHF_SHB band (C23ch to C63ch), in addition to the UHF band.

Accordingly, it is considered that a stationary-type TV receiver for the terrestrial digital TV broadcasting is designed so as to be able to receive the VHF_Low/High band (VHF1ch to VHF12ch), the VHF_MID band (C13ch to C22ch) and the VHF_SHB band (C23ch to C63ch), in addition to the UHF band.

Table 3 shows each reception channel and the center frequency in the VHF_Low/High band (VHF1ch to VHF12ch).

TABLE 3

| Reception channel | Center frequency |
| --- | --- |
| VHF1ch | 93 + 1/7 MHz |
| VHF2ch | 99 + 1/7 MHz |
| VHF3ch | 105 + 1/7 MHz |
| VHF4ch | 173 + 1/7 MHz |
| VHF5ch | 179 + 1/7 MHz |
| VHF6ch | 185 + 1/7 MHz |
| VHF7ch | 191 + 1/7 MHz |
| VHF8ch | 195 + 1/7 MHz |
| VHF9ch | 201 + 1/7 MHz |
| VHF10ch | 207 + 1/7 MHz |
| VHF11ch | 213 + 1/7 MHz |
| VHF12ch | 219 + 1/7 MHz |

Table 4 shows each reception channel and the center frequency in the VHF_MID band (C13ch to C22ch).

TABLE 4

| Reception channel | Center frequency |
| --- | --- |
| C13ch | 111 + 1/7 MHz |
| C14ch | 117 + 1/7 MHz |
| C15ch | 123 + 1/7 MHz |
| C16ch | 129 + 1/7 MHz |
| C17ch | 135 + 1/7 MHz |
| C18ch | 141 + 1/7 MHz |
| C19ch | 147 + 1/7 MHz |
| C20ch | 153 + 1/7 MHz |
| C21ch | 159 + 1/7 MHz |
| C22ch | 165 + 1/7 MHz |

Table 5 shows each reception channel and the center frequency in the VHF_SHB band (C23ch to C63ch).

TABLE 5

| Reception channel | Center frequency |
|---|---|
| C23ch | 225 + 1/7 MHz |
| C24ch | 231 + 1/7 MHz |
| C25ch | 237 + 1/7 MHz |
| . | . |
| . | . |
| . | . |
| C63ch | 465 + 1/7 MHz |

The present invention is also subject to be applied to a TV receiver for the terrestrial digital TV broadcasting capable of receiving (selectively viewing) the VHF_Low/High band (VHF1ch to VHF12ch), the VHF_MID band (C13ch to C22ch) and the VHF_SHB band (C23ch to C63ch), in addition to the original UHF band 13ch to 62ch (470 MHz to 770 MHz).

2. Description of Weak Radio Wave Standard

Description will be given for the Japanese standard of weak radio wave. The weak radio wave standard is defined by an ordinance of the Ministry of Internal Affairs and Communications, as wireless equipment emitting significantly weak radio waves, which is defined by the electric field intensity at a point of 3 meters away.

FIG. 1 and Table 6 show the electric field intensity with respect to the frequency bands defined in the weak radio wave standard (allowance)

TABLE 6

| Frequency band | Electric field intensity at point of 3 m away |
|---|---|
| Less than 322 MHz | 500 µV/m |
| 322 MHz to 10 GHz | 35 µV/m |
| 10 GHz to 150 GHz | 3.5 fµV/m in a range not exceeding 500 µV/m (f: frequency shown by GHz) |
| More than 150 GHz | 500 µV/m |

As shown in Table 6, as for the frequency band which is less than 322 MHz or more than 150 GHz, the allowance is limited to 500 µV/m. Further, as for the frequency band in a range between 322 MHz and 10 GHz, the allowance is limited to 35 µV/m, considering the interference prevention with respect to field moving works, UHF, TV broadcasting, fixed works and space works (earth station). Further, as for frequency band in a range between 10 GHz and 150 GHz, the allowance is limited to 3.5 fµV/m (f: used frequency band (GHz)) considering the system noise temperature, receiving band width and the like.

A wireless system under the wireless standard of weak radio wave has no restriction in frequency, modulating system and communication system if it satisfies the electric field intensity shown in Table 6. Therefore, a relatively free system design is possible.

Figure 2:
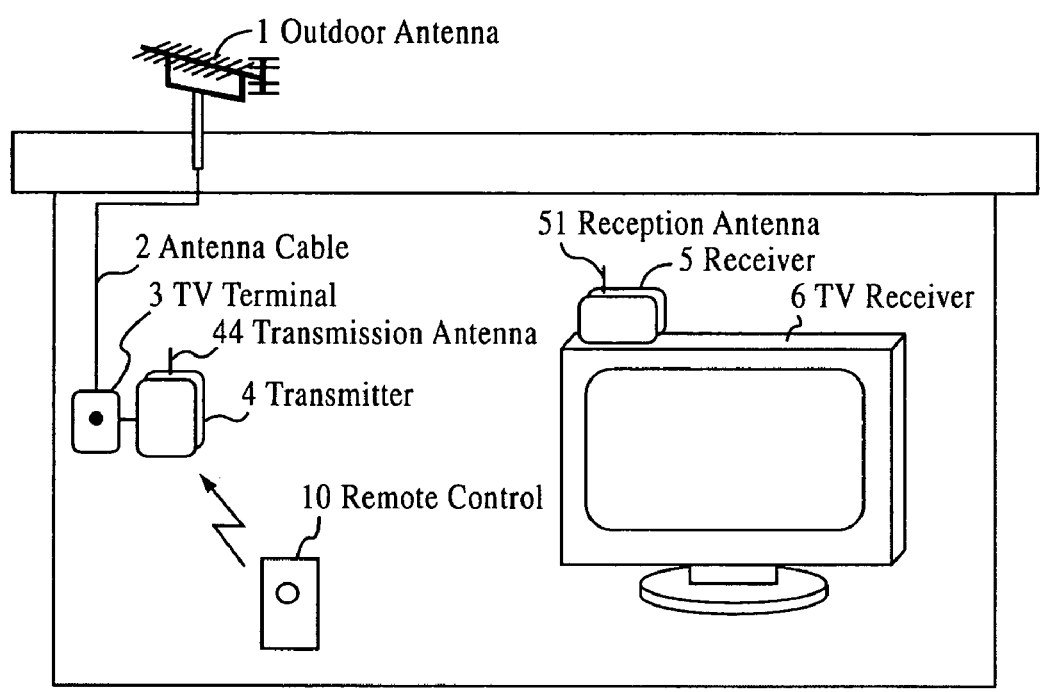
FIG. 2 is a schematic diagram showing the overview of a wireless redistribution system for terrestrial digital TV broadcasting.

3. Description of Wireless Redistribution System for Terrestrial Digital TV Broadcasting FIG. 2 shows the overview of a wireless redistribution system for terrestrial digital TV broadcasting.

Terrestrial digital TV broadcast signals are received by an outdoor antenna 1 provided on the rooftop. The terrestrial digital TV broadcast signals received by the outdoor antenna 1 are guided to a TV terminal 3 provided on a wall of a room by an antenna cable 2.

To the TV terminal 3, a transmitter 4 for redistribution is connected. The transmitter 4 has a remote control transmitter 10 for the transmitter. The remote control transmitter 10 for the transmitter is used by a user to input a desired channel of the terrestrial digital TV broadcasting into the transmitter 4 wirelessly or with an infrared ray.

Based on the desired channel inputted with the remote control transmitter 10 for the transmitter, the transmitter 4 collectively frequency-converts the terrestrial digital TV broadcast signals obtained from the TV terminal 3 such that the frequency of the terrestrial digital TV broadcast signals of the desired channel is converted to the frequency of a specific unused channel of a predetermined VHF band. Then, the transmitter 4 extracts only TV broadcast signals of the frequency of the specific unused channel of the predetermined VHF band from the frequency-converted terrestrial digital TV broadcast signals, and then retransmits them wirelessly from a transmission antenna 44 with weak radio wave not more than the allowance of the weak radio wave standard.

As a specific unused channel of the predetermined VHF band, one which is an unused channel of a VHF band less than 322 MHz where restriction in the weak radio wave standard is lenient is used. In this example, C38 channel (center frequency: 315+1/7 MHz) of the VHF_SHB band is used as a specific unused channel of the predetermined VHF band. In this case, the allowance of the weak radio wave standard is 500 µV/m.

To a TV receiver 6 for terrestrial wave digital TV broadcasting, a receiver 5 for redistribution is connected. The TV receiver 6 for the terrestrial digital TV broadcasting has a TV tuner (terrestrial digital broadcasting TV tuner supporting VHF reception) capable of receiving (capable of selecting and viewing a channel) VHF_Low/High band (VHF1ch to VHF12ch), VHF_MID band (C13ch to C22ch) and VHF_SHB band (C23ch to C63ch), in addition to the original UHF band 13ch to 62ch (470 MHz to 770 MHz).

The receiver 5 receives the redistributed signals transmitted from the transmitter 4 through a reception antenna 51, amplifies the received signals to a predetermined level receivable by the TV tuner inside the TV receiver 6, and then transmits them to the TV receiver 6.

In the TV receiver 6, a specific unused channel of the predetermined VHF band (C38 channel of VHF_SHB band) is selected. Thereby, the terrestrial digital TV broadcasting designated by the remote control transmitter 10 for the transmitter is broadcasted.

Figure 3:
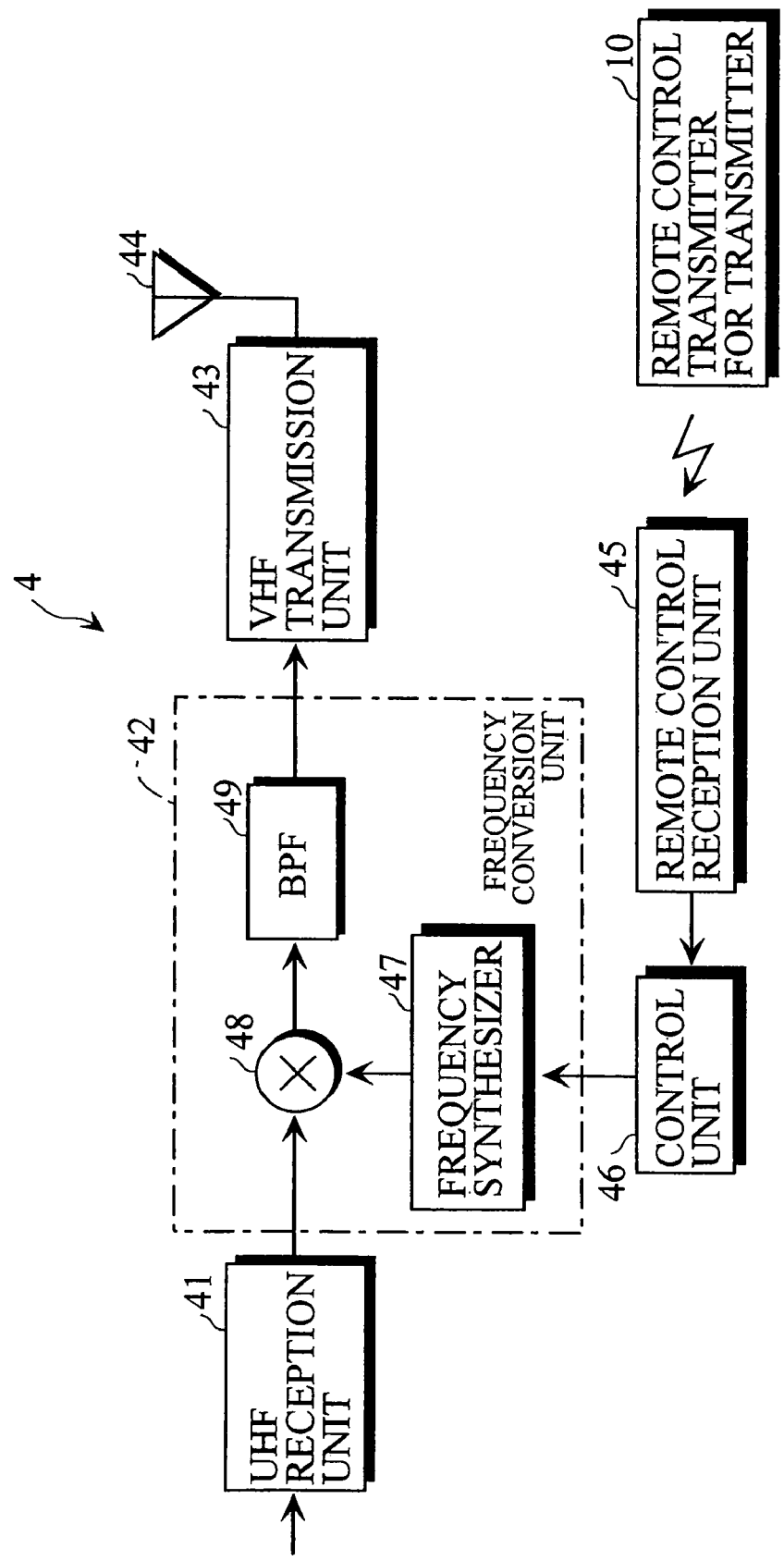
FIG. 3 is a block diagram showing the configuration of a transmitter of FIG. 2.

FIG. 3 shows the configuration of the transmitter 4.

The transmitter 4 includes a UHF reception unit 41, a frequency conversion unit 42, a VHF transmission unit 43, a transmission antenna 44, a remote control reception unit 45, and a control unit 46.

Terrestrial digital TV broadcast signals received by the outdoor antenna 1 are amplified by the UHF reception unit 41, and then transmitted to the frequency conversion unit 42. In the frequency conversion unit 42, all terrestrial digital TV broadcast signals received (received signals) and local signals outputted from a frequency synthesizer 47 are mixed by a mixer 48. From the mixer 48, added signals and subtracted signals of the respective received signals and the local signals are outputted. For example, assuming that the frequency of the received signals is fa and the frequency of the local signals is fb, added signals that the frequency thereof is fa+fb and subtracted signals that the frequency thereof is fa−fb are outputted from the mixer 48. The outputs of the mixer 48 are transmitted to a BPF (bandpass filter) 49, and only signals of a specific unused channel of a predetermined VHF band (in this example, C38 channel of the VHF_SHB band) are extracted.

The frequency fb of the local signals outputted from the frequency synthesizer 47 is controlled by the control unit 46. The control unit 46 controls the frequency fb of the local signals outputted from the frequency synthesizer 47, based on the desired channel of the terrestrial digital TV broadcasting inputted from the remote control transmitter 10 for the transmitter via the remote control reception unit 45 and on a table indicating the predetermined relationship between the desired channel and the local frequency.

That is, the control unit 46 controls the frequency fb of the local signals such that the frequency of the desired channel of the terrestrial digital TV broadcasting is converted to a specific unused channel of a predetermined VHF band (in this example, C38 channel of the VHF_SHB band). More specifically, the frequency fb of the local signals is controlled such that the frequency of the subtracted signals of the terrestrial digital TV broadcast signals of the desired channel and the local signals (fa−fb) becomes the frequency of a specific unused channel of the predetermined VHF band (in this example, C38 channel of the VHF_SHB band).

Figure 7:
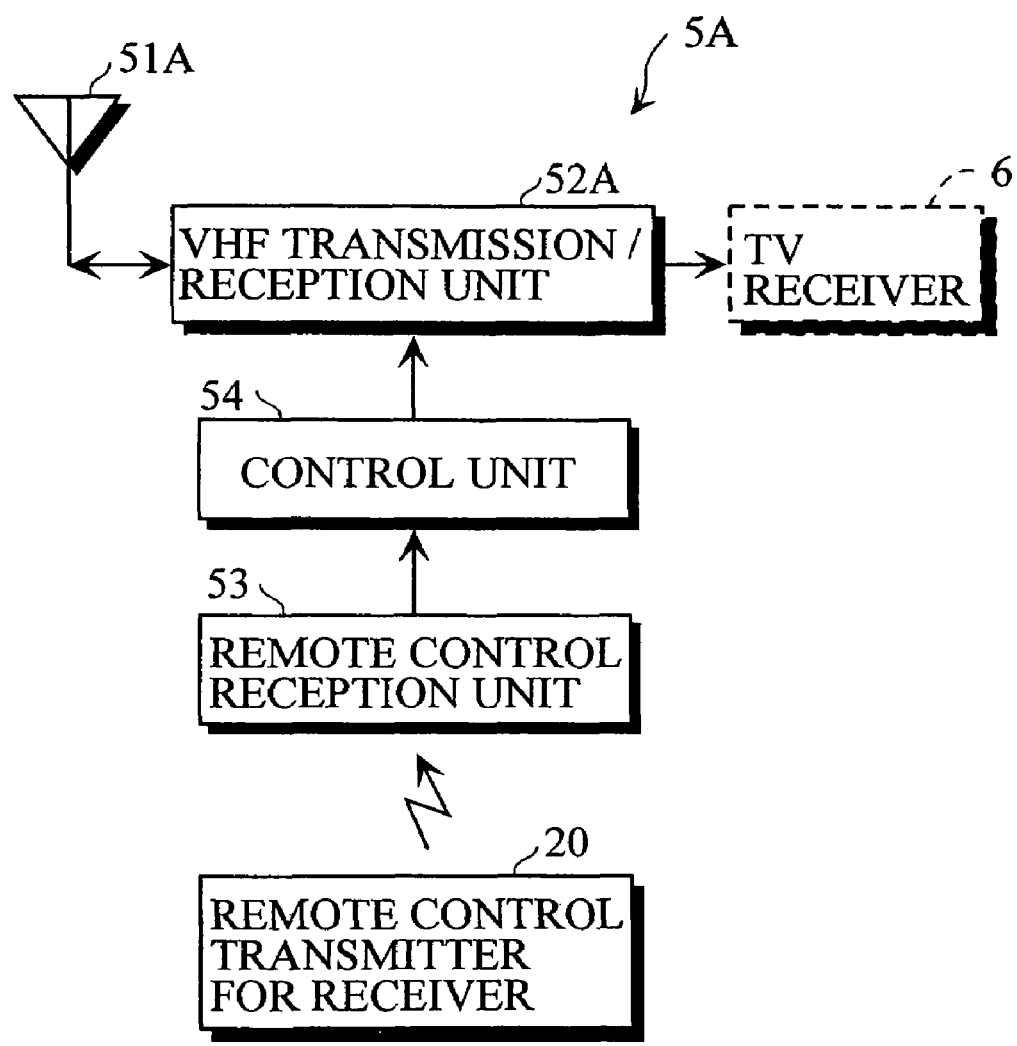
FIG. 7 is a block diagram showing another example of a receiver.

FIG. 7 shows the relationship between desired channels of the terrestrial digital TV broadcasting and frequencies of local signals (redistribution local frequencies) in a case where a specific unused channel of a predetermined VHF band (redistribution broadcasting center frequency) is set to C38 channel of the VHF_SHR band (center frequency: 315+1/7 MHz), in the Kinki wide area in which the channels that the terrestrial digital TV broadcasting is performed and the central frequencies are shown in Table 2.

TABLE 7

| Kinki wide area broadcasting station | Desired channel | Center frequency | Redistribution transmission center frequency | Second redistribution local frequency |
|---|---|---|---|---|
| NHK Education | UHF13 | 473 + 1/7 MHz | 315 + 1/7 MHz | 158 MHz |
| Yomiuri TV | UHF14 | 479 + 1/7 MHz | | 164 MHz |
| Asahi Broadcasting | UHF15 | 485 + 1/7 MHz | | 170 MHz |
| Mainichi Broadcasting | UHF16 | 491 + 1/7 MHz | | 176 MHz |
| Kansai TV | UHF17 | 497 + 1/7 MHz | | 182 MHz |
| TV Osaka | UHF18 | 503 + 1/7 MHz | | 188 MHz |
| NHK General | UHF24 | 539 + 1/7 MHz | | 224 MHz |

For example, when the desired channel is UHF13ch (center frequency: 473+1/7 MHz), the frequency fb of local signals is set to 158 MHz. The frequency fa of TV broadcast signals of UHF13ch is 473+1/7 MHz; therefore, the frequency of subtracted signals of the TV broadcast signals of UHF13ch and the local signals is 315+1/7(=473+1/7−158) MHz, which is the frequency of C38 channel of the VHF_SHB band.

Figure 4:
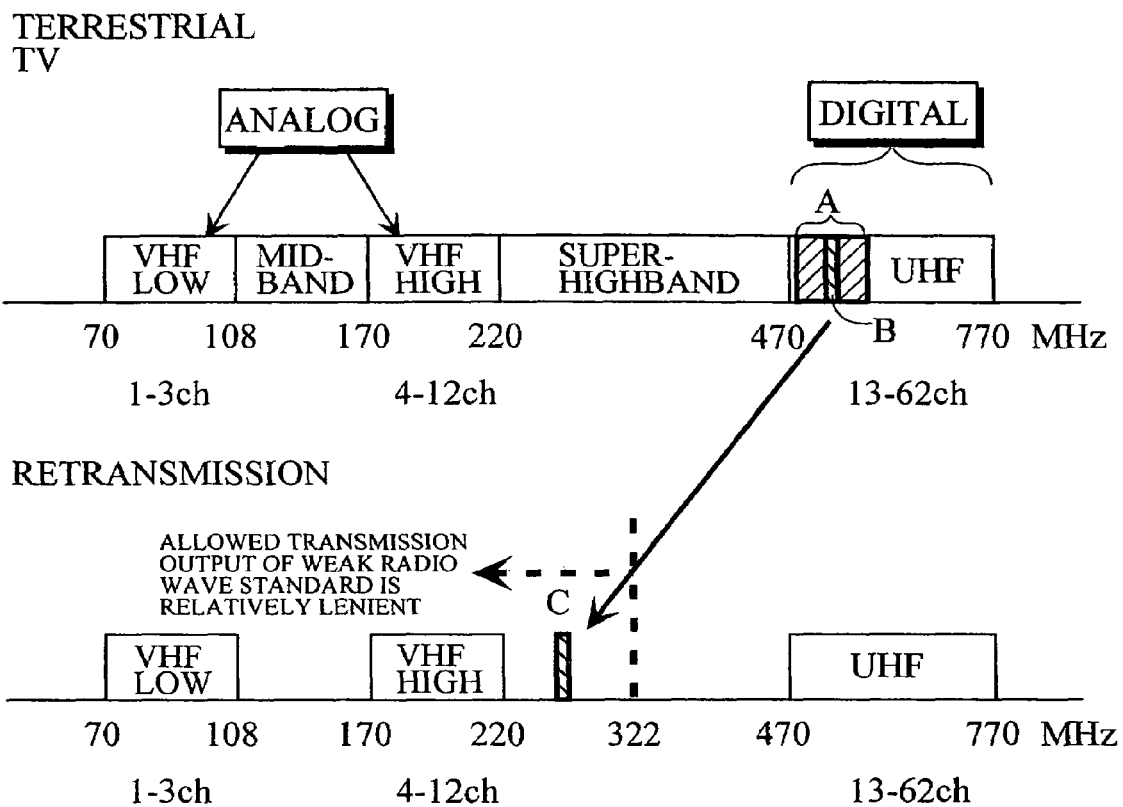
FIG. 4 is a schematic diagram for illustrating frequency conversion by a frequency conversion unit of FIG. 3.

That is, as shown in FIG. 4, assuming that all channels of the terrestrial digital TV broadcast signals received by the outdoor antenna is A, and a desired channel is B, the frequency of the desired channel B is converted by the frequency conversion unit 42 to the frequency of a specific unused channel C of the predetermined VHF band, which is less than 322 MHz.

The terrestrial digital TV broadcast signals frequency-converted to a specific unused channel of the VHF band (in this example, C38 channel of VHF_SHB band) by the frequency conversion unit 42 are amplified by the VHF transmission unit 43, and transmitted wirelessly from the transmission antenna 44. In the VHF transmission unit 43, AGC is performed in such a manner that the signal level, transmitted wirelessly, does not exceed the allowance defined by the weak radio wave standard.

Figure 5:
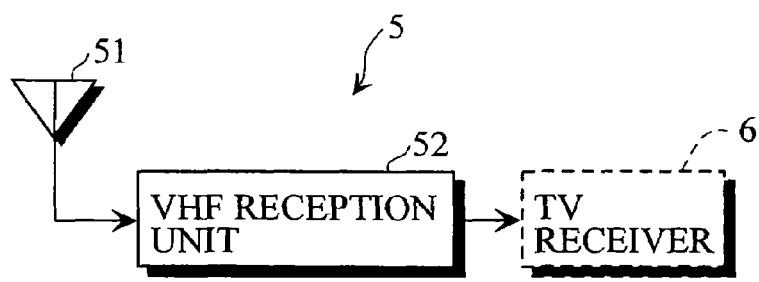
FIG. 5 is a block diagram showing the configuration of a receiver of FIG. 2.

FIG. 5 shows the configuration of the receiver 5.

The receiver 5 includes a reception antenna 51 and a VHF reception unit 52.

Terrestrial digital TV broadcast signals transmitted wirelessly from the transmitter 4 (terrestrial digital TV broadcast signals after frequency-converted to a specific unused channel of the VHF band (in this example, C38 channel of the VHF_SHB band)) are received by the reception antenna 51. The TV broadcast signals received by the reception antenna 51 are amplified by the VHF reception unit 52, and then transmitted to a terrestrial digital broadcasting TV tuner supporting VHF reception inside the TV receiver 6 for the terrestrial digital TV broadcasting.

A user designates a specific unused channel of the predetermined VHF_SHB (in this example, C38 channel of the VHF_SHB band) in the TV receiver 6, whereby the user can view terrestrial digital broadcasting of the desired channel designated by the remote control transmitter 10 for the transmitter. In this example, a channel "C38" is designated as a selected channel in the TV receiver 6, whereby the channel "C38" is selected by the TV receiver 6, and terrestrial digital broadcasting of the desired channel designated by the remote control transmitter 10 for the transmitter is broadcasted.

In the above embodiment, as a specific unused channel of the VHF band, an unused channel of the VHF_SHB band less than 322 MHz is set. However, an unused channel of the VHF_Low/High band or the VHF_MID band less than 322 MHz may be set as a specific unused channel of the VHF band.

In the above embodiment, frequency conversion is performed by the transmitter 4; therefore, it is possible to prevent occurrence of same channel interference of terrestrial digital TV broadcast signals. Further, since the transmitter 4 converts the frequency of terrestrial digital TV broadcast signals to the frequency of the VHF band selectable and operable by the TV receiver 6, the receiver 5 is not required to invert the frequency of the received signals to the original frequency. This provides an advantage that the circuit configuration of the receiver is simple and inexpensive. Further, the receiver 5 only has to receive and amplify signals of a specific channel. This also provides an advantage that the circuit configuration of the receiver is simpler and more inexpensive.

4. Description of First Modification

In the first embodiment, a desired channel is imputed into the transmitter 4 from the remote control transmitter 10 for the transmitter. In a first modification, on the other hand, a desired channel is inputted into the receiver 5 from a remote control transmitter for the receiver, and the desired channel inputted in the receiver 5 is transmitted from the receiver 5 to the transmitter 4.

Figure 6:
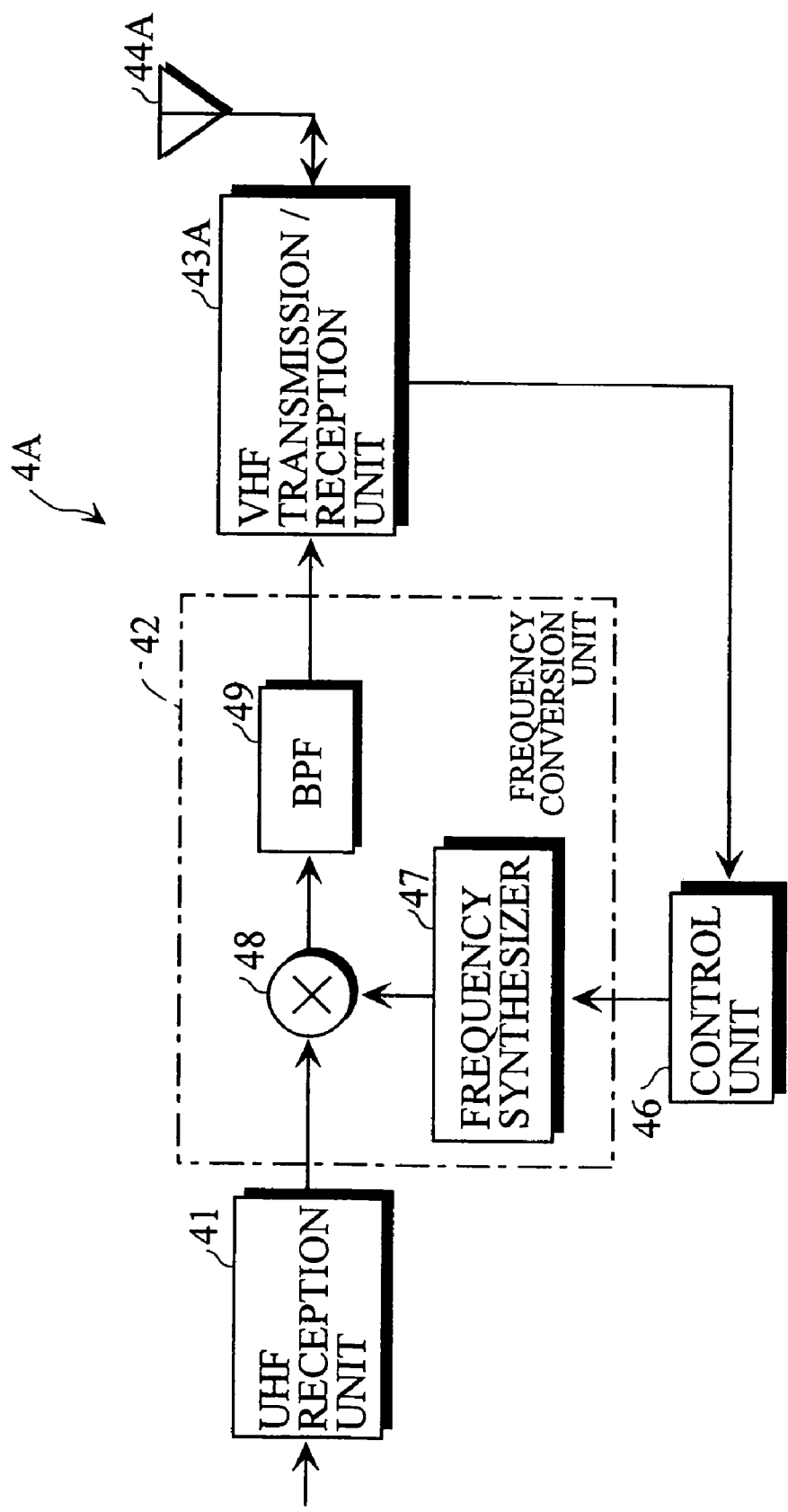
FIG. 6 is a block diagram showing another example of a transmitter.

FIG. 6 shows the configuration of a transmitter 4A, and FIG. 7 shows the configuration of a receiver 5A.

In FIG. 6, components same as those of FIG. 3 are denoted by the same reference numerals, and their descriptions are omitted.

The transmitter 4A includes a UHF reception unit 41, a frequency conversion unit 42, a VHF transmission/reception unit 43A, a transmission/reception antenna 44A and a control unit 46. The receiver 5A includes a transmission/reception antenna 51A, a VHF transmission/reception unit 52A, a remote control reception unit 53 and a control unit 54.

The remote control transmitter 20 for the receiver is used by a user for inputting a desired channel of the terrestrial digital TV broadcasting (channel selection command) wirelessly or with an infrared ray into the receiver 5A. The receiver 5A transmits the desired channel inputted in the remote control reception unit 53 by the remote control transmitter 20 for the receiver via the control unit 54, the VHF transmission/reception unit 52A and the transmission/reception antenna 51A.

The desired channel (channel selection command) transmitted from the receiver 5A is received by the control unit 46 of the transmitter 4A via the transmission/reception antenna 44A and the VHF transmission/reception unit 43A of the transmitter 4A. The control unit 46 of the transmitter 4A controls the frequency synthesizer 47 in the same manner as the first embodiment, based on the desired channel received. Other operations are same as that of the first embodiment; therefore, the description is omitted.

5. Description of Second Modification

In the first embodiment, a desired channel is inputted into the transmitter 4 from the remote control transmitter 10 for the transmitter. In a second modification, on the other hand, a desired channel is inputted into the TV receiver 6 from a remote control transmitter for a TV, and the desired channel inputted in the TV receiver 6 is transmitted to the transmitter 4 via the receiver 5.

The configuration of the transmitter is same as that of FIG. 6. That is, the configuration of the transmitter is same as that of the transmitter 4A of the first modification.

Figure 8:
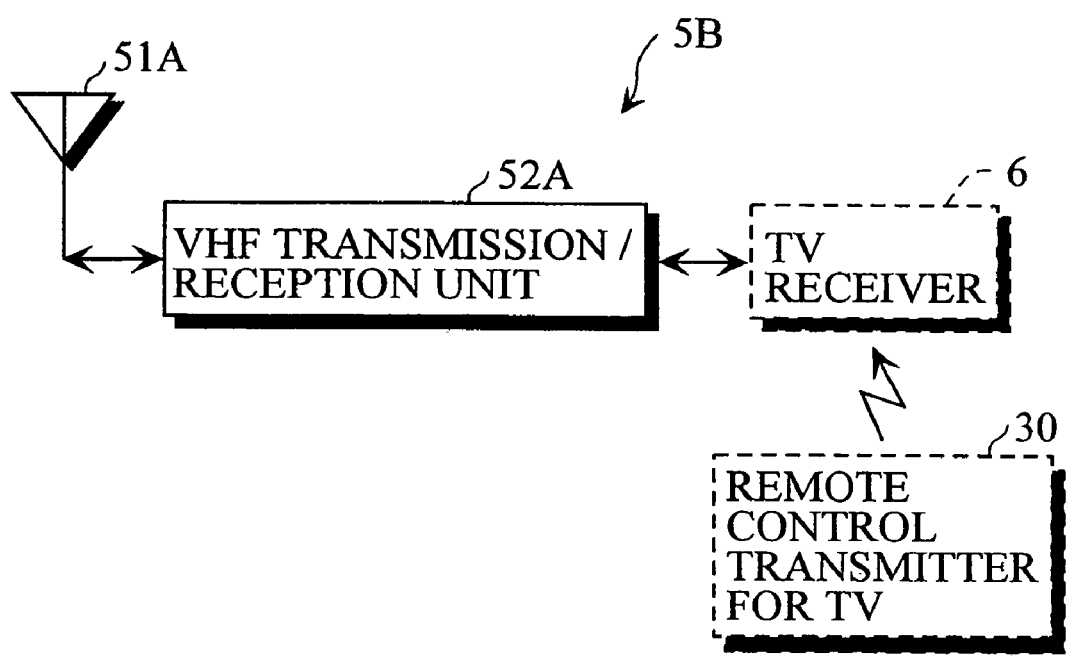
FIG. 8 is a block diagram showing still another example of a receiver.

FIG. 8 shows the configuration of a receiver 5B.

The receiver 5B includes a transmission/reception antenna 51A and a VHF transmission/reception unit 52A. The VHF transmission/reception unit 52A is connected to the TV receiver 6 including a remote control transmitter 30 for a TV. The remote control transmitter 30 for a TV is used for inputting a desired channel of the terrestrial digital TV broadcasting, which should be given to the transmitter 4A, into the TV receiver 6 wirelessly or with an infrared ray, besides a function of a typical remote control transmitter for a TV such as inputting a selected channel (in this example, a specific unused channel of the predetermined VHF_SHB) with respect to the TV receiver 6 into the TV receiver 6 wirelessly or with an infrared ray.

When a desired channel of the terrestrial digital TV broadcasting is inputted from the remote control transmitter 30 for a TV, the TV receiver 6 transmits the inputted desired channel to the receiver 5B. When the desired channel is transmitted from the TV receiver 6, the receiver 5B transmits the transmitted desired channel via the VHF transmission/reception unit 52A and the transmission/reception antenna 51A.

The desired channel transmitted from the receiver 5B is received by the control unit 46 of the transmitter 4A via the transmission/reception antenna 44A and the VHF transmission/reception unit 43A of the transmitter 4A. The control unit 46 of the transmitter 4A controls the frequency synthesizer 47 in the same manner as the first embodiment, based on the desired channel received. Other operations are same as those of the first embodiment; therefore, their descriptions are omitted.

B. Description of Second Embodiment

In the first embodiment, a specific unused channel of the VHF band is always selected on the TV receiver side, so the channel of the terrestrial digital TV broadcasting currently viewed is not easily recognized by the user.

In view of the above, in a second embodiment, the channel of the terrestrial digital TV broadcasting currently viewed is displayed on the TV receiver side such that the user can easily recognize the channel of the terrestrial digital TV broadcasting currently viewed.

Figure 9:
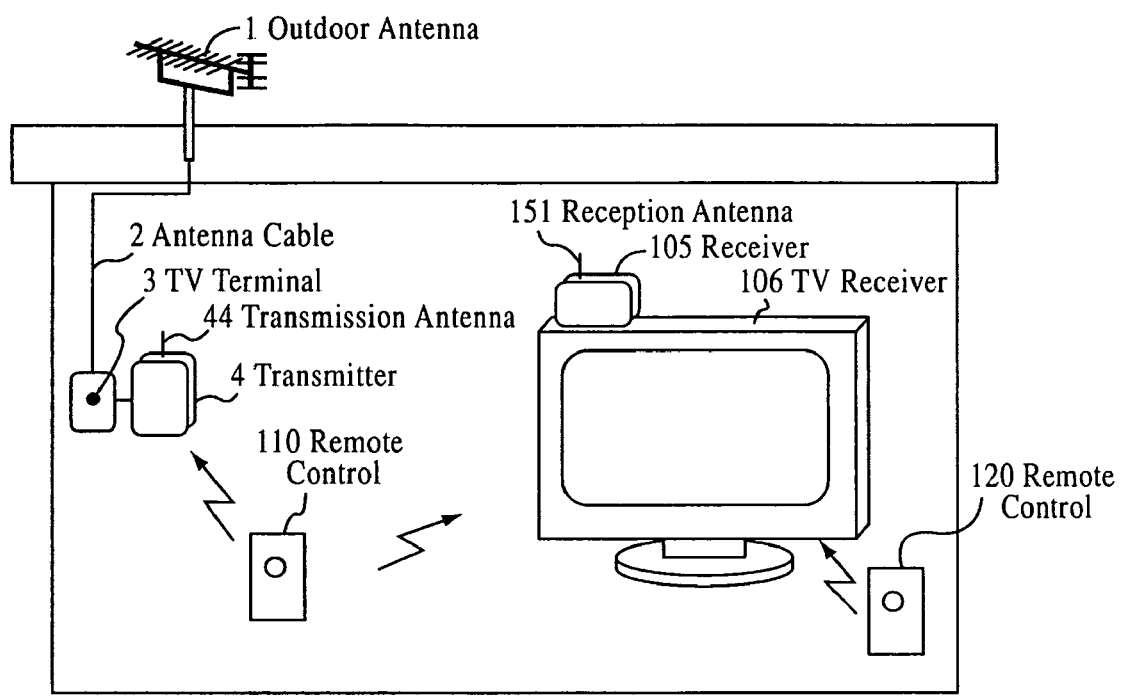
FIG. 9 is a schematic diagram showing the overview of a wireless redistribution system for terrestrial digital TV broadcasting.

1. Description of Wireless Redistribution System for Terrestrial Digital TV Broadcasting FIG. 9 shows the overview of a wireless redistribution system for the terrestrial digital TV broadcasting.

Terrestrial digital TV broadcast signals are received by the outdoor antenna 1 provided on the rooftop. The terrestrial digital TV broadcast signals received by the outdoor antenna 1 are guided to the TV terminal 3 provided on a wall of a room by an antenna cable 2.

To the TV terminal 3, the transmitter 4 for redistribution is connected. As remote control transmitters, a remote control transmitter 110 for redistribution is provided in addition to a typical remote control transmitter 120 for TV. The remote control transmitter 110 for redistribution is used for inputting a desired channel of the terrestrial digital TV broadcasting designated by a user into the transmitter 4 and the TV receiver 106 wirelessly or with an infrared ray.

The transmitter 4 collectively converts the frequency of the terrestrial digital TV broadcast signals obtained from the TV terminal 3 such that the frequency of the terrestrial digital TV broadcast signals of the desired channel is converted to the frequency of a specific unused channel of the predetermined VHF band, based on the desired channel of the terrestrial digital TV broadcasting inputted by the remote control transmitter 110 for redistribution. Then, the transmitter 4 extracts only TV broadcast signals of the frequency of the specific unused channel of the predetermined VHF band, and then retransmits them wirelessly from the transmission antenna 44 with weak radio wave less than the allowance of the weak radio wave standard.

As a specific unused channel of the predetermined VHF band, one which is an unused channel less than 322 MHz in which restriction of the weak radio wave standard is lenient is used. In this example, as a specific unused channel of the predetermined VHF band, C38 channel of the VHF_SHB (center frequency: 315+1/7 MHz) is used. In this case, the allowance of the weak radio wave standard is 500 μV/m.

To the TV receiver 106 for the terrestrial digital TV broadcasting 106, a receiver 105 for redistribution is connected. The TV receiver 106 for the terrestrial digital TV broadcasting has a TV tuner (terrestrial digital broadcasting TV tuner supporting VHF reception) capable of receiving (selectively viewing) the VHF_Low/High band (VHF1ch to VHF12ch), the VHF_MID band (C13ch to C22ch) and VHF_SHB band (C23ch to C63ch), in addition to the original UHF band 13ch to 62ch (470 MHz to 770 MHz).

The receiver 105 receives the redistributed signals transmitted from the transmitter 4 by the reception antenna 151, amplifies the received signals to a predetermined level receivable by the TV tuner inside the TV receiver 106, and then transmits them to the TV receiver 106.

In the TV receiver 106, a specific unused channel of the predetermined VHF band (C38 channel of the VHF_SHB band) is selected, whereby the terrestrial digital TV broadcasting designated by the remote control transmitter 110 for redistribution is broadcasted. Further, in the TV receiver 106, the channel of the terrestrial digital TV broadcasting currently viewed is displayed, based on the desired channel of the terrestrial digital TV broadcasting inputted by the remote control transmitter 110 for redistribution.

Figure 10:
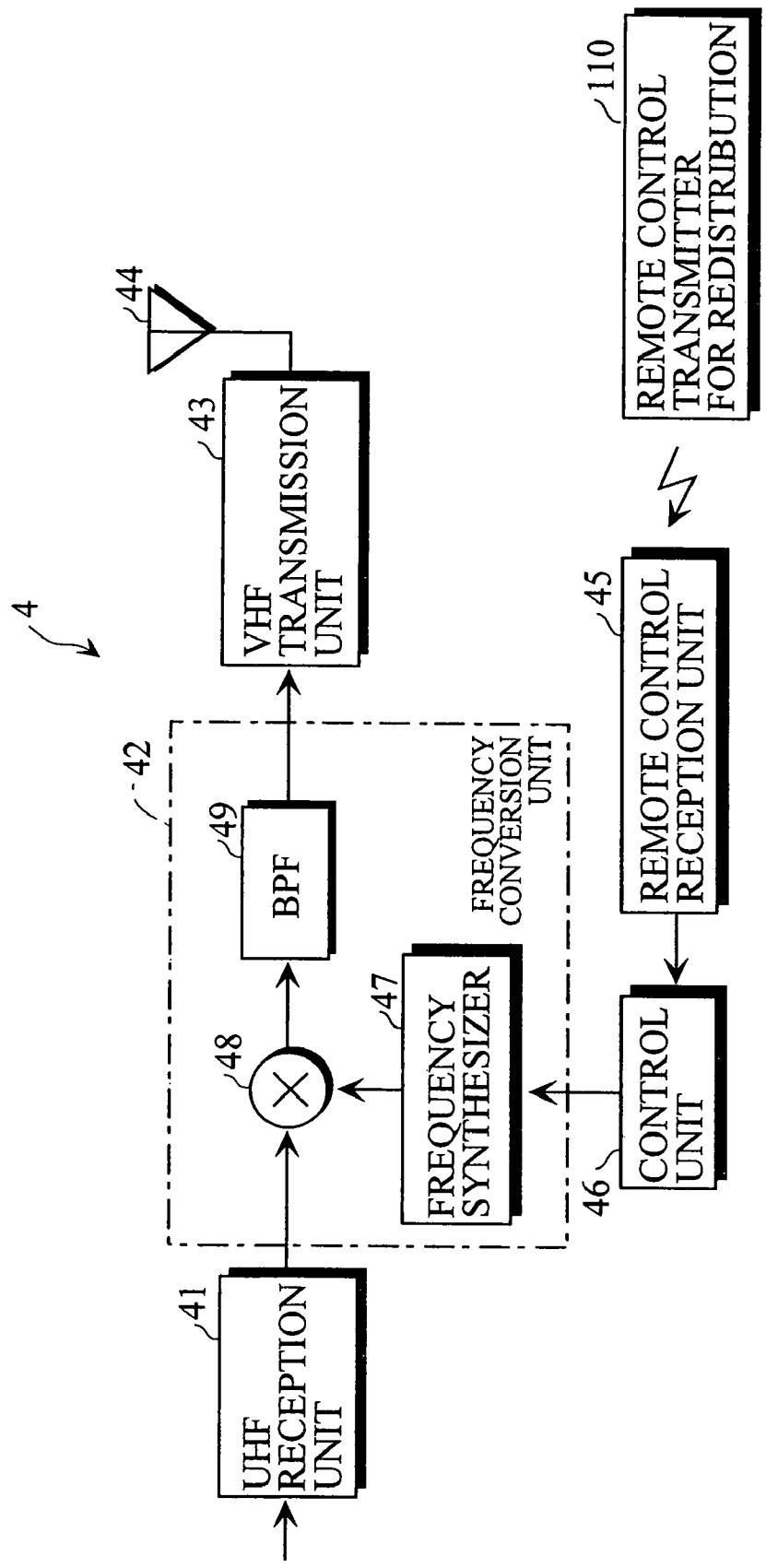
FIG. 10 is a block diagram showing the configuration of a transmitter of FIG. 9.

FIG. 10 shows the configuration of the transmitter 4.

The transmitter 4 includes a UHF reception unit 41, a frequency conversion unit 42, a VHF transmission unit 43, a transmission antenna 44, a remote control reception unit 45 and a control unit 46.

Terrestrial digital TV broadcast signals received by the outdoor antenna 1 are amplified by the UHF reception unit 41, and then transmitted to the frequency conversion unit 42. In the frequency conversion unit 42, all terrestrial digital TV broadcast signals received (received signals) and local signals outputted from the frequency synthesizer 47 are mixed by the mixer 48. From the mixer 48, added signals and subtracted signals of the respective received signals and local signals are outputted. For example, assuming that the frequency of the received signals is fa and the frequency of the local signals is fb, the added signals that the frequency thereof is fa+fb and the subtracted signals that the frequency thereof is fa−fb are outputted from the mixer 48. The outputs of the mixer 48 are transmitted to a BPF (bandpass filter) 49, and only signals of a specific unused channel of the predetermined VHF band (in this example, C38 channel of the VHS_SHB band) are extracted.

The frequency fb of the local signals outputted from the frequency synthesizer 47 is controlled by the control unit 46. The control unit 46 controls the frequency fb of the local signals outputted from the frequency synthesizer 47, based on the desired channel of the terrestrial digital TV broadcasting inputted from the remote control transmitter 110 for redistribution via the remote control reception unit 45, and on a table indicating the predetermined relationship between a desired channel and a local frequency.

That is, the control unit 46 controls the frequency fb of the local signals such that the frequency of the desired channel of the terrestrial digital TV broadcasting is converted to a specific unused channel of the predetermined VHF band (in this example, C38 channel of the VHF_SHB band). More specifically, the frequency fb of the local signals is controlled such that the frequency (fa−fb) of the subtracted signals between the terrestrial digital TV broadcast signals of the desired channel and the local signals becomes the frequency of a specific unused channel of the predetermined VHF band (in this example, C38 channel of the VHF_SHB band).

Table 8 shows the relationship between a desired channel of the terrestrial digital TV broadcasting and the frequency of local signals (redistribution local frequency) in a case where a specific unused channel of the predetermined VHF band (redistribution transmission center frequency) is set to C38 channel of the VHF_SHB band (center frequency: 315+1/7 MHz), in the Kinki wide area in which channels through which the terrestrial digital TV broadcasting is performed and the center frequencies are shown in Table 2

TABLE 8

| Kinki wide area broadcasting station | Desired channel | Center frequency | Redistribution transmission center frequency | Second redistribution local frequency |
|---|---|---|---|---|
| NHK Education | UHF13 | 473 + 1/7 MHz | 315 + 1/7 MHz | 158 MHz |
| Yomiuri TV | UHF14 | 479 + 1/7 MHz | | 164 MHz |
| Asahi Broadcasting | UHF15 | 485 + 1/7 MHz | | 170 MHz |
| Mainichi Broadcasting | UHF16 | 491 + 1/7 MHz | | 176 MHz |

TABLE 8-continued

| Kinki wide area broadcasting station | Desired channel | Center frequency | Redistribution transmission center frequency | Second redistribution local frequency |
|---|---|---|---|---|
| Kansai TV | UHF17 | 497 + 1/7 MHz | | 182 MHz |
| TV Osaka | UHF18 | 503 + 1/7 MHz | | 188 MHz |
| NHK General | UHF24 | 539 + 1/7 MHz | | 224 MHz |

For example, when the desired channel is UHF13ch (center frequency: 473+1/7 MHz), the frequency fb of the local signals is set to 158 MHz. Since the frequency fa of the TV broadcast signals of the UHF13ch is 473+1/7 MHz, the frequency of the subtracted signals of the TV broadcast signals of the UHF13ch and local signals is 315+1/7(=473+1/7−158) MHz, that is, the frequency of C38 channel of the VHF_SHB band.

Figure 11:
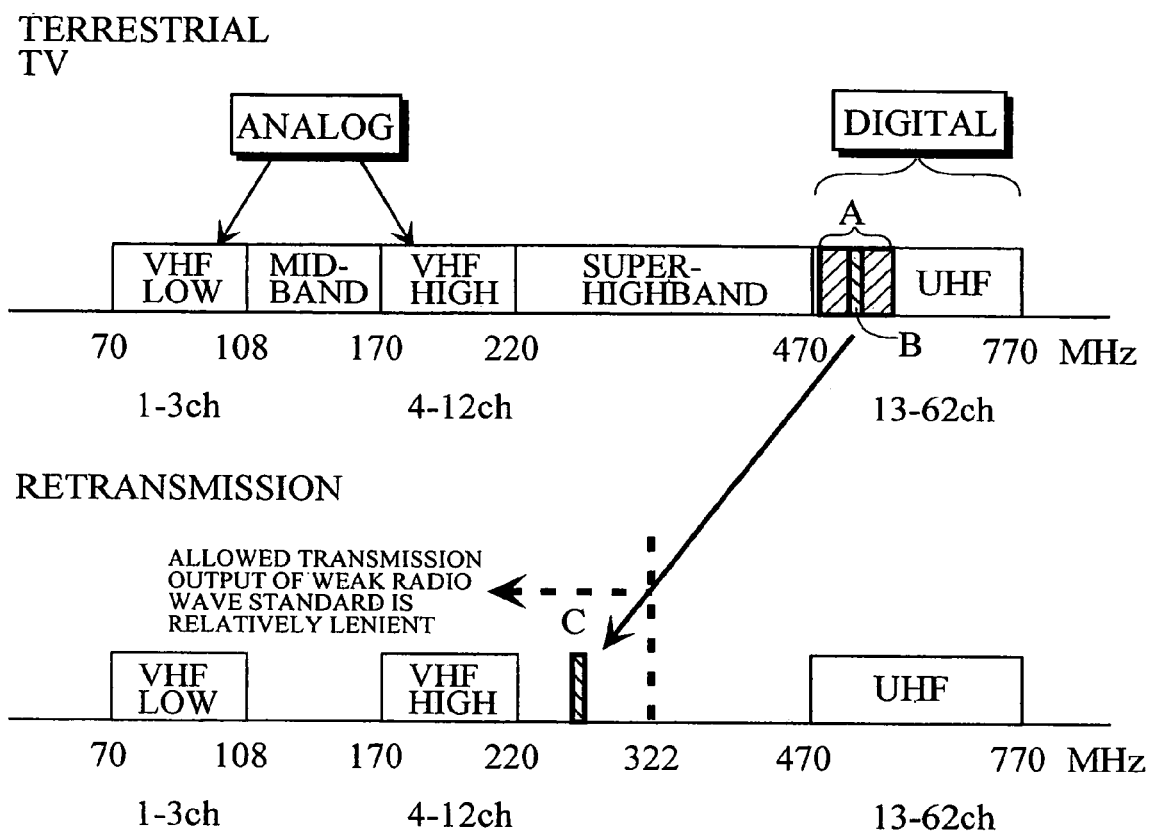
FIG. 11 is a schematic diagram for illustrating frequency conversion by a frequency conversion unit of FIG. 10.

Namely, as shown in FIG. 11, assuming that all channels of the terrestrial digital TV broadcast signals received by the outdoor antenna 1 is A, and a desired channel among them is B, the frequency of the desired channel B is converted by the frequency conversion unit 42 to the frequency of a specific unused channel C of the predetermined VHF band less than 322 MHz.

The terrestrial digital TV broadcast signals, frequency-converted by the frequency conversion unit 42 to a specific unused channel of the VHF band (in this example, C3.8 channel of the VHF_SHB band), are amplified by the VHF transmission unit 43, and transmitted wirelessly from the transmission antenna 44. In the VHF transmission unit 43, AGC is performed in such a manner that the signal level, transmitted wirelessly, does not exceed the allowance of the weak radio wave standard.

Figure 12:
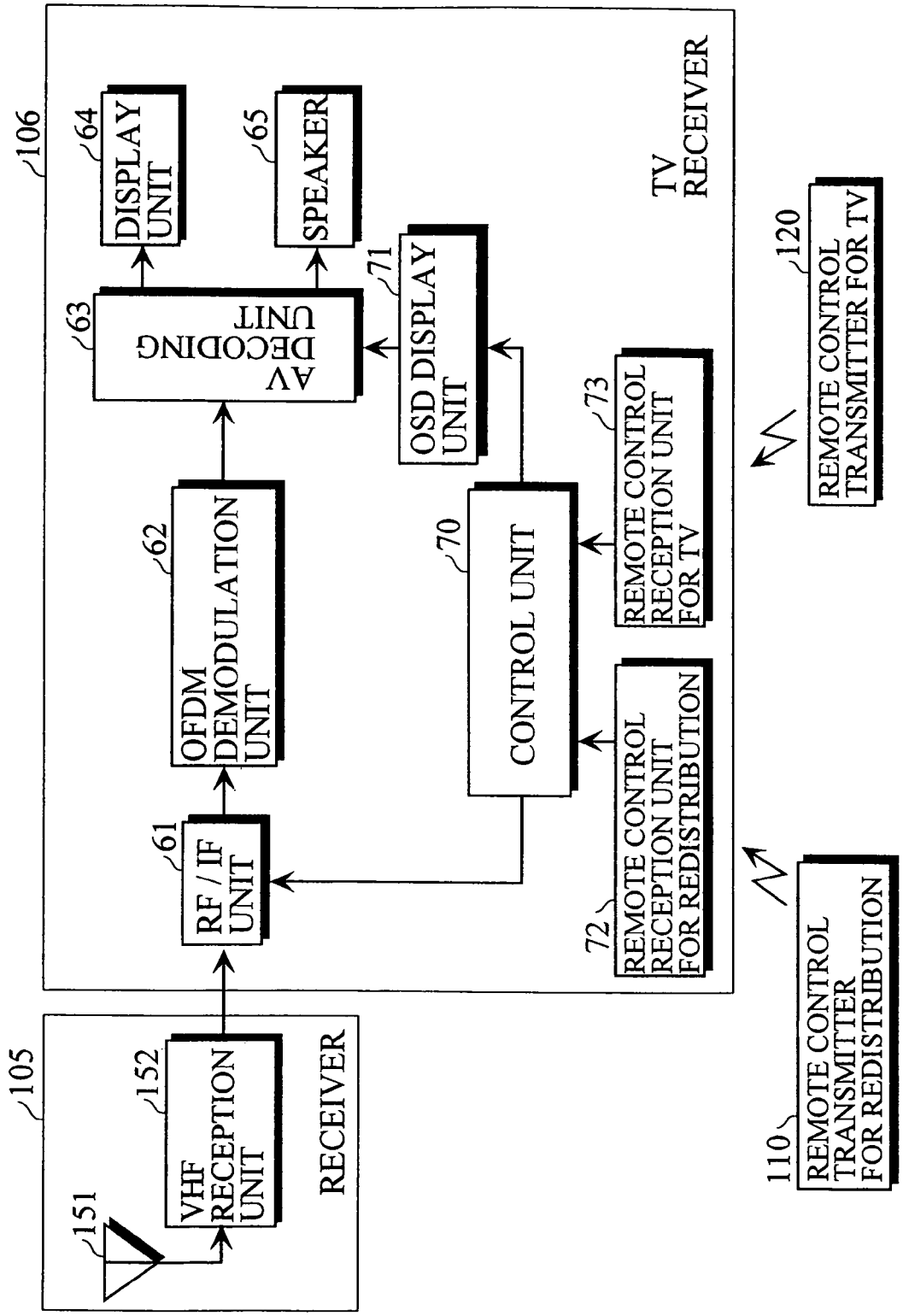
FIG. 12 is a block diagram showing the configurations of a receiver and a TV receiver of FIG. 9.

FIG. 12 shows the configuration of the receiver 105 and the TV receiver 106.

The receiver 105 includes a reception antenna 151 and a VHF receiver 152.

The terrestrial digital TV broadcast signals (terrestrial digital TV broadcast signals which have been frequency-converted to a specific unused channel of the VHF band (in this example, C38 channel of the VHF_SHB band)) wirelessly transmitted from the transmitter 4 are received by the reception antenna 151. The TV broadcast signals received by the reception antenna 151 are amplified by the VHF reception unit 152, and then transmitted to the TV receiver 106 for the terrestrial digital TV broadcasting.

The TV broadcast signals inputted in the TV receiver 106 are transmitted to the RF/IF unit 61. A user defines a specific unused channel of the VHF_SHB predetermined by the remote control transmitter 120 for TV (in this example, C38 channel of the VHF_SHB band) as a selected channel. The selected channel (C38) defined by the remote control transmitter 120 for TV is transmitted to the control unit 70 via the remote control receiver 73 for TV. The RF/IF unit 61 is controlled by the control unit 70 so as to select the selected channel defined by the remote control transmitter 120 for TV (in this example, C38 channel of the VHF_SHB band).

The RF/IF unit 61 down-converts the TV broadcast signals of the C38 channel to baseband signals. The signals obtained by the RF/IF unit 61 are digitally demodulated by an OFDM demodulation unit 62, and then transmitted to an AV decoding unit 63. In the AV decoding unit 63, the received signals are decoded, and video signals and audio signals are reproduced. The reproduced video signals are transmitted to a display unit (monitor) 64, and the reproduced audio signals are transmitted to a speaker 65. As a result, the terrestrial digital broadcasting of the desired channel defined by the remote control transmitter 110 for redistribution is broadcasted.

On the other hand, the desired channel of the terrestrial digital TV broadcasting transmitted from the remote control transmitter for 110 redistribution is inputted into the control unit 70 via the redistribution remote control receiver 72. The control unit 70 generates video signals for OSD indicating the desired channel on an OSD display unit 71, based on the desired channel of the terrestrial digital TV broadcasting inputted via the remote control reception unit 72 for redistribution. The video signals for OSD indicating the desired channel generated from the OSD display unit 71 are transmitted to the display unit 64 via the AV decoding unit 63. As a result, the channel of the terrestrial digital TV broadcasting currently viewed is displayed on-screen on the display unit 64.

Accordingly, the user can recognize the channel of the terrestrial digital TV broadcasting currently viewed.

Note that in the second embodiment, the remote control reception unit 72 for redistribution is provided in the TV receiver 106, and a desired channel transmitted from the remote control transmitter 110 for redistribution is received via the remote control receiver 72 for redistribution. However, a desired channel inputted from the remote control transmitter 110 for redistribution into the transmitter 4 may be inputted from the transmitter 4 to the TV receiver 106 via the receiver 105. In this case, the remote control receiver 72 for redistribution is not necessarily provided in the TV receiver 106.

Further, in the second embodiment, as a specific unused channel of the VHF band, one which is an unused channel of the VHF_SHB band less than 322 MHz is set. However, an unused channel of the VHF_Low/High band or the VHF_MID band, less than 322 MHz, may be set as a specific unused channel of the VHF band.

In the second embodiment, frequency conversion is performed by the transmitter 4, so it is possible to prevent occurrence of a same channel interference of terrestrial digital TV broadcast signals. Further, since the transmitter 4 converts the frequency of terrestrial digital TV broadcast signals to the frequency of the VHF band capable of being selected and operated by the TV receiver 166, the receiver 105 is not required to invert the frequency of the received signals to the original frequency. This provides an advantage that the circuit configuration of the receiver is simple and inexpensive. Further, the receiver 105 only has to receive and amplify signals of a specific channel. This also provides an advantage that the circuit configuration of the receiver is simpler and more inexpensive. Moreover, since the channel of the terrestrial digital TV broadcasting currently viewed is displayed, a user can easily recognize the channel of the terrestrial digital TV broadcasting that he/she is viewing currently.

C. Description of Third Embodiment

In the first embodiment, terrestrial digital TV signals of a viewing desired channel defined by a predetermined input means is converted to have the frequency of a specific unused channel of the VHF band. However, if another weak radio wave device is used in the one frequency or a near frequency, interference or disturbance may be generated, so that improper receiving conditions or receiving troubles may be caused. In view of the above, a third embodiment is intended to improve the receiving quality and the receiving probability.

Figure 13:
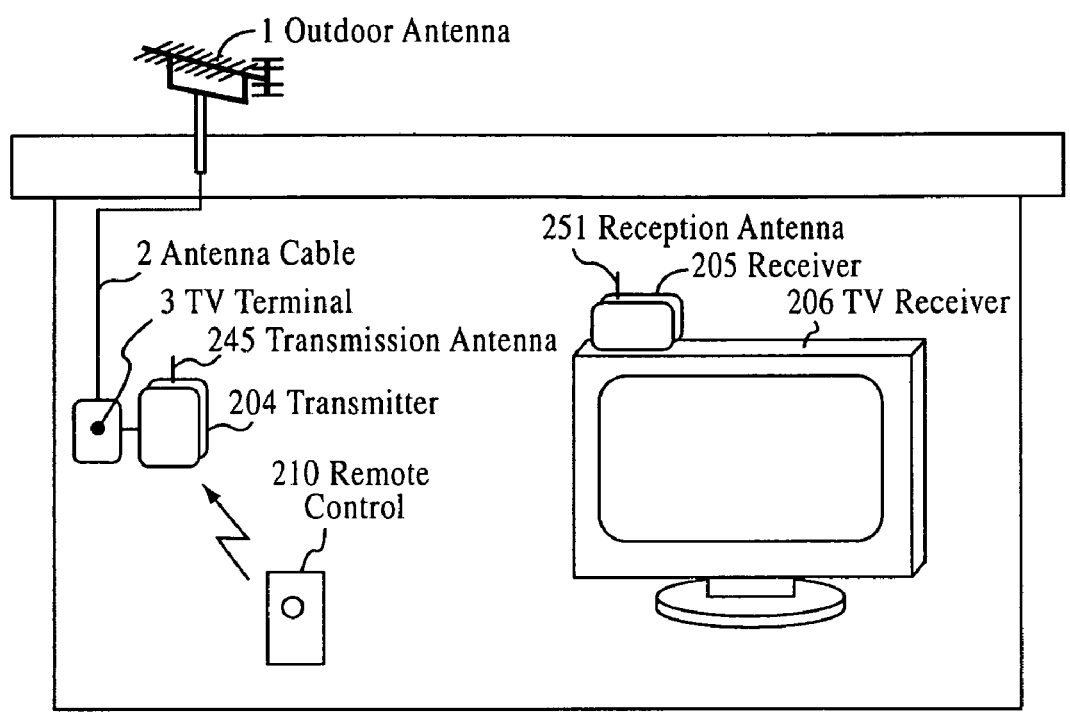
FIG. 13 is a schematic diagram showing the overview of a wireless redistribution system for terrestrial digital TV broadcasting.

1. Description of Wireless Redistribution System for Terrestrial Digital TV Broadcasting FIG. 13 shows the overview of a wireless redistribution system for terrestrial digital TV broadcasting.

Terrestrial digital TV broadcast signals are received by the outdoor antenna 1 provided on the rooftop. The terrestrial digital TV broadcast signals received by the outdoor antenna 1 are guided to the TV terminal 3 provided on a wall of a room by the antenna cable 2.

The wireless redistribution system for the terrestrial digital TV broadcasting includes a transmitter 204 for redistribution connected to the TV terminal 3, a remote control transmitter 210 for the transmitter, and a receiver 205 for redistribution connected to the TV receiver 206 for the terrestrial digital TV broadcasting.

The remote control transmitter 210 for the transmitter is used by a user for inputting a desired channel of the terrestrial digital TV broadcasting to the transmitter 204 wirelessly or with an infrared ray. The TV receiver 206 for the terrestrial digital TV broadcasting has a TV tuner (terrestrial digital broadcasting TV tuner supporting VHF reception) capable of receiving (selectively viewing) VHF_Low/High band (VHF1ch to VHF12ch), VHF_MID band (C13ch to C22ch) and VHF_SHB band (C23ch to C63ch), in addition to the original UHF band 13ch to 62ch (470 MHz to 770 MHz).

Figure 14:
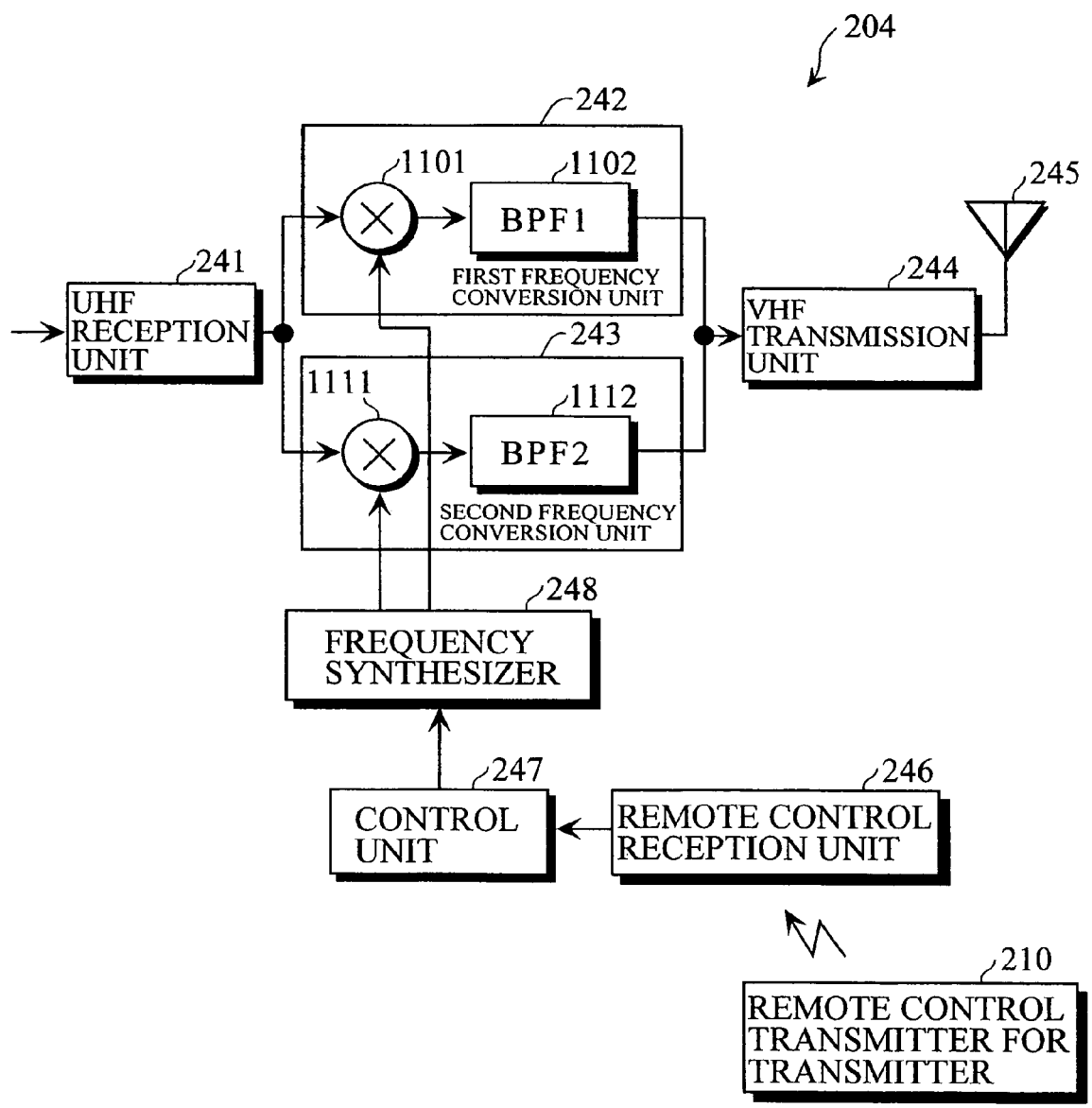
FIG. 14 is a block diagram showing the configuration of a transmitter of FIG. 13.

FIG. 14 shows the configuration of the transmitter 204.

The transmitter 204 includes a UHF reception unit 241, a first frequency conversion unit 242, a second frequency conversion unit 243, a VHF transmission unit 244, a transmission antenna 245, a remote control reception unit 246, a control unit 247 and a frequency synthesizer 248.

The terrestrial digital TV broadcast signals received by the outdoor antenna 1 are amplified by the UHF reception unit 241, and then transmitted to the first frequency conversion unit 242 and the second frequency conversion unit 243.

Based on the desired channel inputted by the remote control transmitter 210 for the transmitter, the first frequency conversion unit 242 frequency-converts the terrestrial digital TV broadcast signals obtained from the TV terminal 3 collectively such that the frequency of the terrestrial digital TV broadcast signals of the desired channel is converted to the frequency of a first specific unused channel of the predetermined VHF band, and extracts only TV broadcast signals of a first specific unused channel from the terrestrial digital TV broadcast signals which have been frequency-converted.

Based on the desired channel inputted by the remote control transmitter 210 for the transmitter, the second frequency conversion unit 243 frequency-converts the terrestrial digital TV broadcast signals obtained from the TV terminal 3 collectively such that the frequency of the terrestrial digital TV broadcast signals of the desired channel is converted to the frequency of the second specific unused channel of the predetermined VHF band, and extracts only TV broadcast signals of the frequency of a second specific unused channel from the terrestrial digital TV broadcast signals which have been frequency-converted.

As a first specific unused channel and a second specific unused channel, unused channels of the VHF band less than 322 MHz where restriction of the weak radio wave standard is lenient are used. In this example, C36 channel of the VHF_SHB band (center frequency: 303+⅐ MHz) is used as a first specific unused channel, and C38 channel of the VHF_SHB band (center frequency: 315+⅐ MHz) is used as a second specific unused channel. In this case, the allowance of the weak radio wave standard is 500 μV/m.

More specifically, in the first frequency conversion unit 242, all terrestrial digital TV broadcast signals received (received signals) and first local signals outputted from the frequency synthesizer 248 are mixed by a mixer 1101. From the mixer 1101, added signals and subtracted signals of the respective received signals and the first local signals are outputted. For example, assuming that the frequency of the received signals is fa and the frequency of the first local signals is fb, added signals that the frequency thereof is fa+fb and subtracted signals that the frequency thereof is fa−fb are outputted from the mixer 1101. The outputs from the mixer 1101 are transmitted to a first bandpass filter (BPF1) 1102, and only signals of a first specific unused channel of the predetermined VHF band (in this example, C36 channel of the VHF_SHB band (center frequency: 303+$\frac{1}{7}$ MHz)) are extracted.

The frequency fb of the first local signals outputted from the frequency synthesizer 248 is controlled by the control unit 247. The control unit 247 controls the frequency fb of the first local signals outputted from the frequency synthesizer 248 based on the desired channel of the terrestrial digital TV broadcasting designated from the remote control transmitter 210 for the transmitter via the remote control reception unit 246 and a table indicating the predetermined relationship between a desired channel and the first local frequency.

That is, the control unit 247 controls the frequency fb of the first local signals such that the frequency of the desired channel of the terrestrial digital TV broadcasting is converted to a specific unused channel of the predetermined VHF band (in this example, C36 channel of the VHF_SHB band). More specifically, the control unit 247 controls the frequency fb of the local signals such that the frequency (fa−fb) of subtracted signals of the terrestrial digital TV broadcast signals of the desired channel and the first local signals becomes the frequency of a specific unused channel of the predetermined VHF band (in this example, C36 channel of the VHF_SHB band).

In the second frequency conversion unit 243, all terrestrial digital TV broadcast signals received (received signals) and second local signals outputted from the frequency synthesizer 248 are mixed by a mixer 1111. From the mixer 1111, added signals and subtracted signals of the respective received signals and the second local signals are outputted. For example, assuming that the frequency of the received signals is fa and the frequency of the second local signals is fc, added signals that the frequency thereof is fa+fc and subtracted signals that the frequency thereof is fa−fc are outputted from the mixer 1111. The outputs from the mixer 1111 are transmitted to a second bandpass filter (BPF2) 1112, and only signals of the second specific unused channel of the predetermined VHF band (in this example, C38 channel of the VHF_SHB band (center frequency: 315+$\frac{1}{7}$ MHz)) are extracted.

The frequency fc of the second local signals outputted from the frequency synthesizer 248 is controlled by the control unit 247. The control unit 247 controls the frequency fc of the second local signal outputted from the frequency synthesizer 248 based on the desired channel of the terrestrial digital TV broadcasting designated from the remote control transmitter 210 for the transmitter via the remote control reception unit 246 and a table indicating the predetermined relationship between the desired channel and the second local frequency.

That is, the control unit 247 controls the frequency fc of the second local signals such that the frequency of the desired channel of the terrestrial digital TV broadcasting is converted to the second specific unused channel of the predetermined VHF band (in this example, C38 channel of the VHF_SHB band). More specifically, the control unit 247 controls the frequency fc of the second local signals such that the frequency (fa−fc) of the subtracted signals of the terrestrial digital TV broadcasting of the desired channel and the second local signals becomes the frequency of the second specific unused channel of the predetermined VHF band (in this example, C38 channel of the VHF_SHB band).

Table 9 shows the relationship between desired channels of the terrestrial digital TV broadcasting and the frequencies of the first local signals (first redistribution local frequencies) in a case of setting a specific unused channel of the predetermined VHF band (redistribution transmission center frequency) to C36 channel of the VHF_SHB band (center frequency: 303+$\frac{1}{7}$ MHz), in the Kinki wide area in which channels and the center frequencies through which the terrestrial digital TV broadcasting is performed are shown in Table 2.

TABLE 9

| Kinki wide area broadcasting station | Desired channel | Center frequency | Redistribution transmission center frequency | First redistribution local frequency |
|---|---|---|---|---|
| NHK Education | UHF13 | 473 + $\frac{1}{7}$ MHz | 303 + $\frac{1}{7}$ MHz | 170 MHz |
| Yomiuri TV | UHF14 | 479 + $\frac{1}{7}$ MHz | | 176 MHz |
| Asahi Broadcasting | UHF15 | 485 + $\frac{1}{7}$ MHz | | 182 MHz |
| Mainichi Broadcasting | UHF16 | 491 + $\frac{1}{7}$ MHz | | 188 MHz |
| Kansai TV | UHF17 | 497 + $\frac{1}{7}$ MHz | | 190 MHz |
| TV Osaka | UHF18 | 503 + $\frac{1}{7}$ MHz | | 200 MHz |
| NHK General | UHF24 | 539 + $\frac{1}{7}$ MHz | | 236 MHz |

Table 10 shows the relationship between desired channels of the terrestrial digital TV broadcasting and frequencies of the second local signals (second redistribution local frequencies) in a case of setting a specific unused channel of the predetermined VHF band (redistribution transmission center frequency) to C38 channel of the VHF_SHB band (center frequency: 315+$\frac{1}{7}$ MHz), in the Kinki wide area in which channels and the center frequencies through which the terrestrial digital TV broadcasting is performed are shown in Table 2.

TABLE 10

| Kinki wide area broadcasting station | Desired channel | Center frequency | Redistribution transmission center frequency | Second redistribution local frequency |
|---|---|---|---|---|
| NHK Education | UHF13 | 473 + $\frac{1}{7}$ MHz | 315 + $\frac{1}{7}$ MHz | 158 MHz |
| Yomiuri TV | UHF14 | 479 + $\frac{1}{7}$ MHz | | 164 MHz |
| Asahi Broadcasting | UHF15 | 485 + $\frac{1}{7}$ MHz | | 170 MHz |
| Mainichi Broadcasting | UHF16 | 491 + $\frac{1}{7}$ MHz | | 176 MHz |
| Kansai TV | UHF17 | 497 + $\frac{1}{7}$ MHz | | 182 MHz |
| TV Osaka | UHF18 | 503 + $\frac{1}{7}$ MHz | | 188 MHz |
| NHK General | UHF24 | 539 + $\frac{1}{7}$ MHz | | 224 MHz |

For example, when the desired channel is UHF13ch (center frequency: 473+$\frac{1}{7}$ MHz), the frequency fc of the second local signals is set to 158 MHz. Since the frequency fa of the TV broadcast signals of UHF13ch is 473+$\frac{1}{7}$ MHz, the frequency of the subtracted signals of the TV broadcast signals of UHF13ch and the second local signals is 315+$\frac{1}{7}$(=473+$\frac{1}{7}$−158) MHz, that is, the frequency of C38 channel of the VHF_SHB band.

The terrestrial digital TV broadcast signals frequency-converted by the first frequency conversion unit 242 to the first specific unused channel of the VHF band (in this example, C36 channel of the VHF_SHB band) and the terrestrial digital TV broadcast signals frequency-converted by the second frequency conversion unit 243 to the second specific unused channel of the VHF band (in this example, C38 channel of the VHF_SHB band) are amplified by the VHF transmission unit 244 and transmitted wirelessly from the transmission antenna 245. In the VHF transmission unit 244, AGC is performed in such a manner that the signal level, transmitted wirelessly, does not exceed the allowance of the weak radio wave standard.

Figure 15:
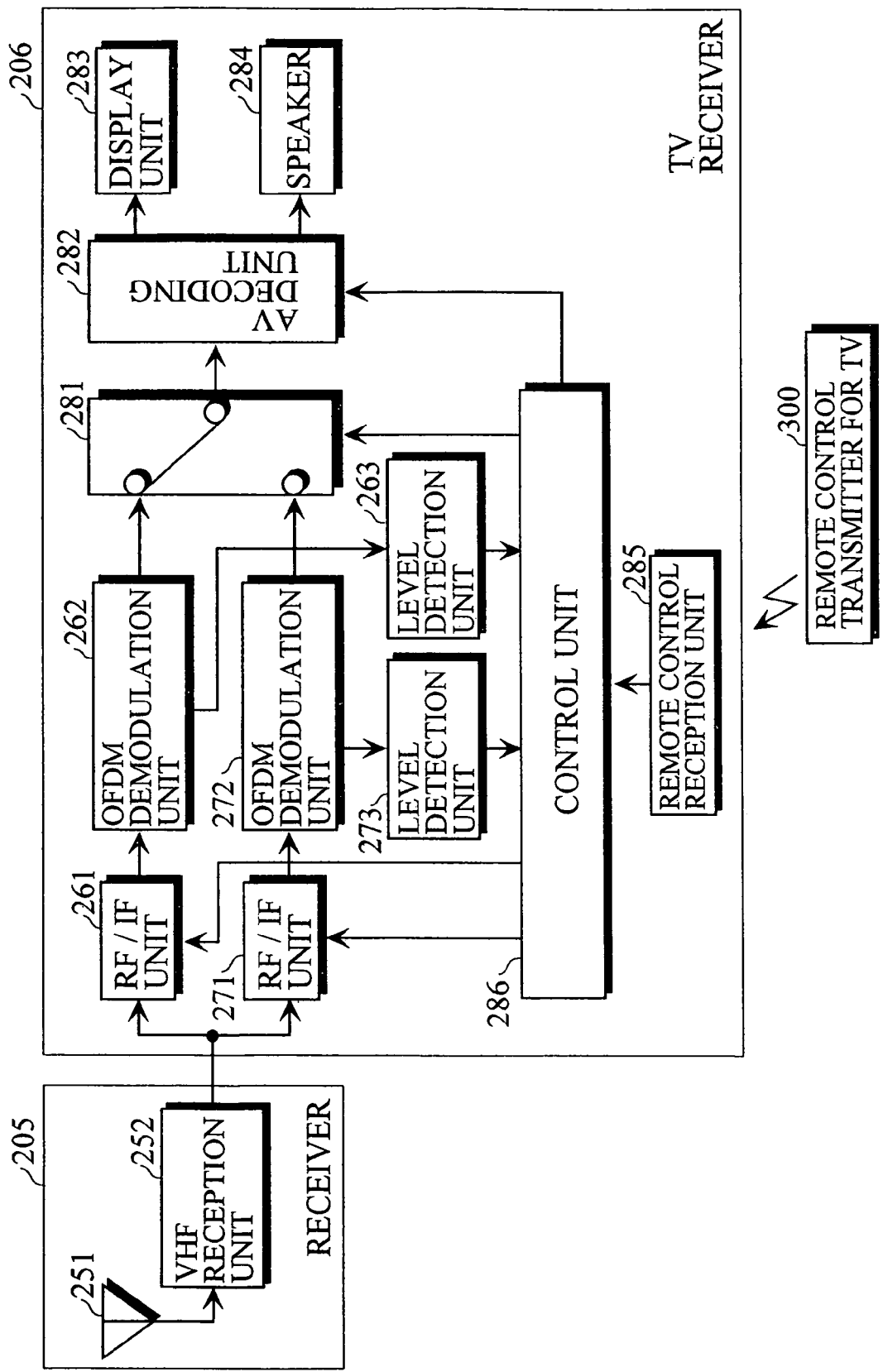
FIG. 15 is a block diagram showing the configurations of a receiver and a TV receiver of FIG. 13.

FIG. 15 shows the configurations of the receiver 205 and the TV receiver 206.

The receiver 205 includes a reception antenna 251 and a VHF reception unit 252.

The TV broadcast signals transmitted wirelessly from the transmitter 204 (the terrestrial digital TV broadcast signals which have been frequency-converted to the first specific unused channel of the VHF band (in this example, C36 channel of the VHF_SHB band) and the terrestrial digital TV broadcast signals which have been frequency-converted to the second specific unused channel of the VHF band (in this example, C38 channel of the VHF_SHB band) are received by the reception antenna 251. The TV broadcast signals received by the reception antenna 251 are amplified by the VHF reception unit 252, and then transmitted to the TV receiver 206 for the terrestrial digital TV broadcasting.

The TV broadcast signals inputted in the TV receiver 206 are transmitted to a first RF/IF unit 261 and to a second RF/IF unit 271. The first RF/IF unit 261 is controlled by the control unit 286 to select the first specific unused channel (C36 channel), and the second RF/IF unit 271 is controlled by the control unit 286 to select the second specific unused channel (C38 channel).

The first RF/IF unit 261 down-converts the TV broadcast signals of the C36 channel to baseband signals. The signals obtained by the first RF/IF unit 261 are digitally demodulated by a first OFDM demodulation unit 262, and then transmitted to a first input terminal of a selection switch 281 and to a first level detection unit 263. The first level detection unit 263 detects the level of the received signals of the C36 channel obtained by the first OFDM demodulation unit 262, and gives it to the control unit 286.

The second RF/IF unit 271 down-converts the TV broadcast signals of the C38 channel to baseband signals. The signals obtained by the second RF/IF unit 271 are digitally demodulated by a second OFDM demodulation unit 272, and then transmitted to a second input terminal of the selection switch 281 and to a second level detection unit 273. The second level detection unit 273 detects the level of the received signals of the C38 channel obtained by the second OFDM demodulation unit 272, and gives it to the control unit 286.

The control unit 286 compares the received signal level of the C36 channel given by the first level detection unit 263 with the received signal level of the C38 channel given by the second level detection unit 273, and based on the comparison result, controls the selection switch 281. In other words, when the received signal level of the C36 channel is larger than the received signal level of the C38 channel, the selection switch 281 is controlled so as to select the received signals of the C36 channel. In contrast, when the received signal level of the C38 channel is larger than the received signal level of the C36 channel, the selection switch 281 is controlled so as to select the received signals of the C38 channel.

The received signals selected by the selection switch 281 are transmitted to an AV decoding unit 282. In the AV decoding unit 282, the received signals are decoded and the video signals and audio signals are reproduced. The reproduced video signals are transmitted to the display unit (monitor) 283, and the reproduced audio signals are transmitted to the speaker 284.

Note that the remote control reception unit 285 receives remote control signals from the remote control transmitter 300 for the TV and gives them to the control unit 286. The first specific unused channel (C36) and the second specific unused channel (C38) are set by operating the remote control transmitter 300 for the TV.

2. Description of Modification of TV Receiver

FIG. 16 shows a modification of a TV receiver.

In FIG. 16, same components as those in FIG. 15 are denoted by the same reference numerals and their descriptions are omitted.

In the TV receiver in FIG. 15, the received signal level of the first specific unused channel of the VHF band (C36 channel) and the received signal level of the second specific unused channel of the VHF band (C38 channel) are compared, whereby the selection switch 281 is controlled.

On the other hand, in a TV receiver 206A in FIG. 16, the error rate of the received signals of the first specific unused channel of the VHF band (C36 channel) and the error rate of the received signals of the second specific unused channel of the VHF band (C38 channel) are compared, whereby the selection switch 281 is controlled.

The error rate of a first OFDM demodulation unit 262 is detected by a first error rate detection unit 264. Further, the error rate of a second OFDM demodulation unit 272 is detected by a second error rate detection unit 274. The error rates detected by the both error rate detection units 264 and 274 are given to the control unit 286.

The control unit 286 compares the error rate of the received signals of the C36 channel given by the first error rate detection unit 264 with the error rate of the received signals of the C38 channel given by the second error rate detection unit 274, and based on the comparison result, controls the selection switch 281. That is, when the error rate of the received signals of the C36 channel is lower than the error rate of the received signals of the C38 channel, the selection switch 281 is controlled such that the received signals of the C36 channel are selected. In contrast, when the error rate of the received signals of the C38 channel is lower than the error rate of the received signals of the C36 channel, the selection switch 281 is controlled such that the received signals of the C38 channel are selected.

In the third embodiment, transmission channels for rearrangement are two channels (C36, C38), but they may be three or more channels.

According to the third embodiment, terrestrial digital TV broadcast signals of the desired channel are rearranged on a plurality of transmission channels, and those with high receiving quality are selectively reproduced among the TV broadcast signals of a plurality of channels rearranged. Thereby, it is possible to improve the receiving quality and the receiving probability.

D. Description of Application of This Invention in the United States

In Japan, a frequency band where restriction relating to the electric field intensity is lenient with respect to the frequency band is less than 322 MHz, as described above. Therefore, in the first to third embodiments, the transmitters 4, 4A and 204 convert the frequency of terrestrial digital TV signals (TV signals of UHF band) of a desired channel to a specific frequency (or two specific frequencies) which is an unused channel of the VHF band less than 322 MHz where restriction in weak radio wave standard is lenient.

In the United States, on the other hand, a UHF band is a frequency band in a range between 470 MHz and 890 MHz, and a VHF band is a frequency band in a range between 54 MHz and 470 MHz. According to the Radio Law of the United States, a frequency band where restriction relating to the electric field intensity is lenient with respect to the frequency band is in a range between 260 MHz and 470 MHz.

Therefore, when the present invention is applied in the United States, a transmitter may convert the frequency of terrestrial digital TV signals (TV signals of the UHF band) of a desired channel to a specific frequency (or two specific frequencies) which is an unused channel of the VHF band within a range between 260 MHz and 470 MHz where restriction relating to the electric field intensity with respect to the frequency band is lenient.

What is claimed is:

1. A wireless redistribution system for terrestrial digital TV broadcasting, which is applied to a TV receiver capable of receiving TV broadcast signals of a VHF band in addition to TV broadcast signals of a UHF band as a frequency band of terrestrial digital TV broadcast signals, the system comprising:
    a transmitter, into which terrestrial digital TV broadcast signals received by an outdoor antenna are inputted, for frequency-converting the terrestrial digital TV broadcast signals inputted and then transmitting them wirelessly;
    viewing desired channel input means for inputting a viewing desired channel of the terrestrial digital TV broadcasting into the transmitter; and
    a receiver for receiving and amplifying signals transmitted from the transmitter, and then supplying them to the TV receiver, wherein
    the transmitter includes:
    frequency conversion means for collectively frequency-converting terrestrial digital TV broadcast signals inputted such that the frequency of terrestrial digital TV broadcast signals of a viewing desired channel inputted by the viewing desired channel input means, among the terrestrial digital TV broadcast signals inputted, are converted to a frequency of a specific unused channel of a predetermined VHF band;
    filter means for extracting only TV broadcast signals of the specific unused channel of the predetermined VHF band among the TV broadcast signals obtained by the frequency conversion means; and
    transmission means for amplifying and wirelessly transmitting the TV broadcast signals extracted by the filter means.

2. The wireless redistribution system for terrestrial digital TV broadcasting according to claim 1, wherein
    the frequency of the specific unused channel of the predetermined VHF band is a frequency of a specific unused channel of a VHF band within a range between 260 MHz and 470 MHz.

3. The wireless redistribution system for terrestrial digital TV broadcasting according to claim 1, wherein
    the viewing desired channel input means is a remote control transmitter for transmitting the viewing desired channel to the transmitter wirelessly or with an infrared ray.

4. The wireless redistribution system for terrestrial digital TV broadcasting according to claim 1, wherein
    the viewing desired channel input means includes:
    a remote control transmitter for transmitting the viewing desired channel to the receiver wirelessly or with an infrared ray; and
    means, provided in the receiver, for receiving the viewing desired channel transmitted from the remote control transmitter, and transmitting it to the transmitter.

5. The wireless redistribution system for terrestrial digital TV broadcasting according to claim 1, wherein
    the viewing desired channel input means includes:
    a remote control transmitter for a TV for transmitting the viewing desired channel to the TV receiver wirelessly or with an infrared ray;
    means, provided in the TV receiver, for receiving the viewing desired channel transmitted from the remote control transmitter for the TV, and transmitting it to the receiver; and
    means, provided in the receiver, for transmitting the viewing desired channel transmitted from the TV receiver to the transmitter.

6. A wireless redistribution system for terrestrial digital TV broadcasting, comprising:
    a TV receiver capable of receiving TV broadcast signals of a VHF band in addition to TV broadcast signals of a UHF band as a frequency of terrestrial digital TV broadcast signals;
    a transmitter, into which terrestrial digital TV broadcast signals received by an outdoor antenna is inputted, for frequency-converting the terrestrial digital TV broadcast signals inputted and then transmitting them wirelessly;
    viewing desired channel input means for inputting a viewing desired channel of the terrestrial digital TV broadcasting into the transmitter and into the TV receiver; and
    a receiver for receiving and amplifying signals transmitted from the transmitter and then supplying them to the TV receiver, wherein
    the transmitter includes:
    frequency conversion means for collectively frequency-converting the terrestrial digital TV broadcast signals inputted such that a frequency of the terrestrial digital TV broadcast signals of the viewing desired channel inputted by the viewing desired channel input means, among the terrestrial digital TV broadcast signals inputted, is converted to a frequency of a specific unused channel of a predetermined VHF band;
    filter means for extracting only TV broadcast signals of the specific unused channel of the predetermined VHF band among the TV broadcast signals obtained by the frequency conversion means; and
    transmission means for amplifying and wirelessly transmitting the TV broadcast signals extracted by the filter means, and
    the TV receiver includes:
    means for displaying the viewing desired channel of the terrestrial digital TV broadcasting inputted by the viewing desired channel input means.

7. The wireless redistribution system for terrestrial digital TV broadcasting according to claim 6, wherein
    the frequency of the specific unused channel of the predetermined VHF band is a frequency of a specific unused channel of a VHF band within a range between 260 MHz and 470 MHz.

8. The wireless redistribution system for terrestrial digital TV broadcasting according to claim 6, wherein
the viewing desired channel input means is a remote control transmitter for transmitting the viewing desired channel to the transmitter and to the TV receiver wirelessly or with an infrared ray.

9. The wireless redistribution system for terrestrial digital TV broadcasting according to claim 6, wherein
the viewing desired channel input means includes:
a remote control transmitter for transmitting the viewing desired channel to the transmitter wirelessly or with an infrared ray; and
means for inputting the viewing desired channel, transmitted from the remote control transmitter to the transmitter, into the TV receiver via the transmitter and the receiver.

10. A wireless redistribution system for terrestrial digital TV broadcasting, comprising:
a TV receiver capable of receiving TV broadcast signals of a VHF band in addition to TV broadcast signals of a UHF band as a frequency of terrestrial digital TV broadcast signals;
a transmitter, into which terrestrial digital TV broadcast signals received by an outdoor antenna is inputted, for frequency-converting the terrestrial digital TV broadcast signals inputted and then transmitting them wirelessly;
viewing desired channel input means for inputting a viewing desired channel of the terrestrial digital TV broadcasting into the transmitter; and
a receiver for receiving and amplifying signals transmitted from the transmitter, and then supplying them to the TV receiver, wherein
the transmitter includes:
first means for frequency-converting terrestrial digital TV broadcast signals of the viewing desired channel inputted by the viewing desired channel input means, among the terrestrial digital TV broadcast signals inputted to a plurality of unused channels of a predetermined VHF band; and
second means for amplifying and wirelessly transmitting the terrestrial digital TV broadcast signals of the viewing desired channel frequency-converted to the plurality of unused channels of the VHF band by the first means, and
the TV receiver includes:
selection means for selecting TV broadcast signals of a channel having a high receiving quality, among the TV broadcast signals of the plurality of channels supplied from the transmitter via the receiver; and
reproduction means for reproducing the TV broadcast signals selected by the selection means.

11. The wireless redistribution system for terrestrial digital TV broadcasting according to claim 10, wherein
the frequency of the specific unused channel of the predetermined VHF band is a frequency of a specific unused channel of a VHF band within a range between 260 MHz and 470 MHz.

12. The wireless redistribution system for terrestrial digital TV broadcasting according to claim 10, wherein
the selection means selects TV broadcast signals of a channel having high receiving quality by comparing received signal levels of TV broadcast signals of the plurality of channels supplied from the transmitter via the receiver.

13. The wireless redistribution system for terrestrial digital TV broadcasting according to claim 10, wherein
the selection means selects TV broadcast signals of a channel having high receiving quality by comparing received signal error rates of TV broadcast signals of the plurality of channels supplied from the transmitter via the receiver.

* * * * *